United States Patent
Itoh et al.

(10) Patent No.: US 7,403,827 B2
(45) Date of Patent: Jul. 22, 2008

(54) EQUIPMENT CONTROL SYSTEM

(75) Inventors: Kazuo Itoh, Hirakata (JP); Osamu Kanbara, Ibaraki (JP)

(73) Assignee: Sanyo Electric Co., Ltd., Osaka (JP)

( * ) Notice: Subject to any disclaimer, the term of this patent is extended or adjusted under 35 U.S.C. 154(b) by 432 days.

(21) Appl. No.: 11/149,259

(22) Filed: Jun. 10, 2005

(65) Prior Publication Data

US 2005/0278040 A1    Dec. 15, 2005

(30) Foreign Application Priority Data

| Jun. 9, 2004 | (JP) | ............................. 2004-171835 |
| May 16, 2005 | (JP) | ............................. 2005-142742 |

(51) Int. Cl.
*G05B 19/18* (2006.01)
*G05B 15/02* (2006.01)

(52) U.S. Cl. ........................................... 700/65; 700/9

(58) Field of Classification Search ................ 700/9, 700/65
See application file for complete search history.

(56) References Cited

U.S. PATENT DOCUMENTS

| 6,230,150 B1 * | 5/2001 | Walker et al. ................ 705/400 |
| 6,304,895 B1 * | 10/2001 | Schneider et al. ............ 709/203 |
| 6,385,497 B1 * | 5/2002 | Ogushi et al. ............... 700/110 |
| 6,385,772 B1 * | 5/2002 | Courtney ..................... 725/105 |
| 6,437,692 B1 * | 8/2002 | Petite et al. .................. 340/540 |
| 6,766,209 B2 * | 7/2004 | Aiuchi et al. ................ 700/110 |
| 6,901,299 B1 * | 5/2005 | Whitehead et al. ............ 700/22 |
| 6,978,627 B2 * | 12/2005 | Masui et al. ................... 62/127 |
| 7,062,540 B2 * | 6/2006 | Reddy et al. ................. 709/217 |
| 7,120,830 B2 * | 10/2006 | Tonack ......................... 714/27 |
| 7,130,701 B1 * | 10/2006 | Wischinski ................... 700/65 |
| 7,203,560 B1 * | 4/2007 | Wylie et al. ................. 700/110 |

FOREIGN PATENT DOCUMENTS

JP    2001-182987    7/2001

* cited by examiner

*Primary Examiner*—Thomas K Pham
(74) *Attorney, Agent, or Firm*—McDermott Will & Emery LLP

(57) ABSTRACT

A technology for achieving energy saving by efficiently controlling each of a plurality of equipment systems is proposed. The equipment control system includes an air conditioner system, a refrigerator system, a refrigerator/freezer showcase system and a central coordinator. Status data related to electric equipment provided in the systems is transmitted to the central coordinator. The central coordinator computes control data for the systems, based on the status data of the electric equipment transmitted. The central coordinator is provided with the function of computing the control data, based only on the status data of the corresponding electric equipment and the function of computing the control data, allowing for the status data of another of electric equipment in addition to the status data of the corresponding electric equipment.

19 Claims, 13 Drawing Sheets

EQUIPMENT CONTROL SYSTEM

BACKGROUND OF THE INVENTION

1. Field of the Invention

The present invention relates to an equipment control system for controlling an equipment group comprising a plurality of units and, more particularly, to an equipment control system for controlling equipment such as refrigeration facilities and air conditioning equipment that affect room temperature.

2. Description of the Related Art

It is common for retail outlets selling food like supermarkets or convenience stores to have installed therein a plurality of equipment units such as a refrigerator/freezer showcase for cooling articles for sale and air conditioning equipment for managing indoor air conditions. In this background, technologies have been proposed for managing a plurality of equipment units installed in a shop. For example, JP 2001-182987 proposes a technology for managing various equipment units such as a refrigerator/freezer showcase, an air conditioner and lighting equipment installed in a shop.

With efforts being actively pursued in recent years towards energy conservation by saving energy (hereinafter, referred to as energy saving), it is expected that a new technology be proposed for achieving energy saving in food outlets. In this background, energy saving measures have been taken for individual equipment units in, for example, shops in which a plurality of equipment units affecting room temperature are installed, However, few proposals have been made of technologies for achieving energy saving, allowing for overall operating status of the equipment.

In a system in which given equipment is controlled, allowing for the operating status of other equipment, a malfunction such as a failure in a single equipment unit may affect the way other equipment units are controlled. In such a system, a malfunction in a single equipment unit may incur a situation in which the operation of the entirety of equipment is suspended.

SUMMARY OF THE INVENTION

The present invention has been done in view of the aforementioned circumstances and its object is to provide a technology capable of achieving energy saving by efficiently controlling each of a plurality of equipment units.

In order to achieve the aforementioned object, the present invention according to one aspect provides an equipment control system. The equipment control system according to this aspect comprises: a plurality of equipment groups; an equipment controller which is provided in each equipment group and which controls the operation of the corresponding equipment group; and a supervising unit which supervises the equipment controllers, receives status data of the equipment groups transmitted from the equipment controllers, and computes control data for each of the equipment controllers, based on the status data of the corresponding equipment group and the status data of at least another equipment group. Each of the equipment controllers may control the corresponding equipment group, based on the control data computed by the supervising unit.

According to the equipment control system of this aspect, the control data for the equipment controllers is computed, based on the status data of the corresponding equipment group and the status data of at least another equipment group. With this, the equipment controllers are mutually coordinated in their control. Energy saving is achieved by efficiently controlling the equipment groups. The term "equipment group" refers to a single or a plurality of equipment units. The term "control data" refers to data in general which the equipment controller uses to control the corresponding equipment group. The term "status data" refers to data in general related to the equipment group. For example, the status data includes control data for the equipment group, a status variable that varies with the operating condition of the equipment group and the like.

The supervising unit may be provided not only with the function of computing the control data for each of the controllers, based on the status data of the corresponding equipment group and the status data of at least another equipment group, but also with the function of computing the control data for each of the controllers, based only on the status data of the corresponding equipment group. By providing the coordinator with a plurality of functions of computing the control data for the equipment controllers, the method of computing the control data may be modified in adaptation to situations so that the equipment group can be efficiently controlled. The term "corresponding equipment group" refers to a group of equipment subject to control by the equipment controller.

The present invention according to another aspect also provides an equipment control system. The equipment control system comprises: a plurality of: equipment groups; an equipment controller which is provided in each equipment group and which controls the operation of the corresponding equipment group; and a relay unit which transmits status data of the equipment group transmitted from each of the equipment controllers to the other equipment groups. Each of the equipment controllers may control the corresponding equipment group, based on the status data of the equipment group subject to the controller's control for operation and the status data of at least another equipment group transmitted from the supervising unit.

According to the equipment control system as described, the control data for the equipment controllers is computed, based on the status data of the equipment group subject to the controller's control for operation and the status data of at least another equipment group. With this, the equipment controllers are mutually coordinated in their control, and so energy saving is achieved by efficiently controlling the equipment groups.

The equipment group may include equipment that affects room temperature depending on its operating conditions. Such a situation often benefits from the advantage of efficient energy saving. The term "equipment" encompasses electric equipment, which may absorb or radiate heat as a result of its operation, instead of being installed for the purpose of absorbing or radiating heat in the space. Equipment for radiating heat in the space such as equipment for heating canned beverage in a convenience store or the like, as well as refrigeration facilities for absorbing heat, is an example encompassed.

Arbitrary combinations of the aforementioned constituting elements and implementations of the invention in the form of methods, apparatuses, systems, recording mediums and computer programs may also be practiced as additional modes of the present invention.

DETAILED DESCRIPTION OF THE INVENTION

One of the features presented in the examples related to the inventive equipment control system is that, in a practically closed space such as a shop and a facility, status data related to a plurality of equipment units including, for example, air conditioning equipment and refrigeration facilities, is systematically utilized for efficient operation of electric equipment and power-saving. The term "practically closed space" refers to a substantially closed space not open to the outside under normal conditions and encompasses a floor of a department store in which a space to sell food is provided, in addition to a shop or a facility. In order for a space to be practically closed, the space only needs to be substantially closed as a whole. The space may have at a portion thereof a channel communicating with the outside.

First Embodiment

Figure 1:
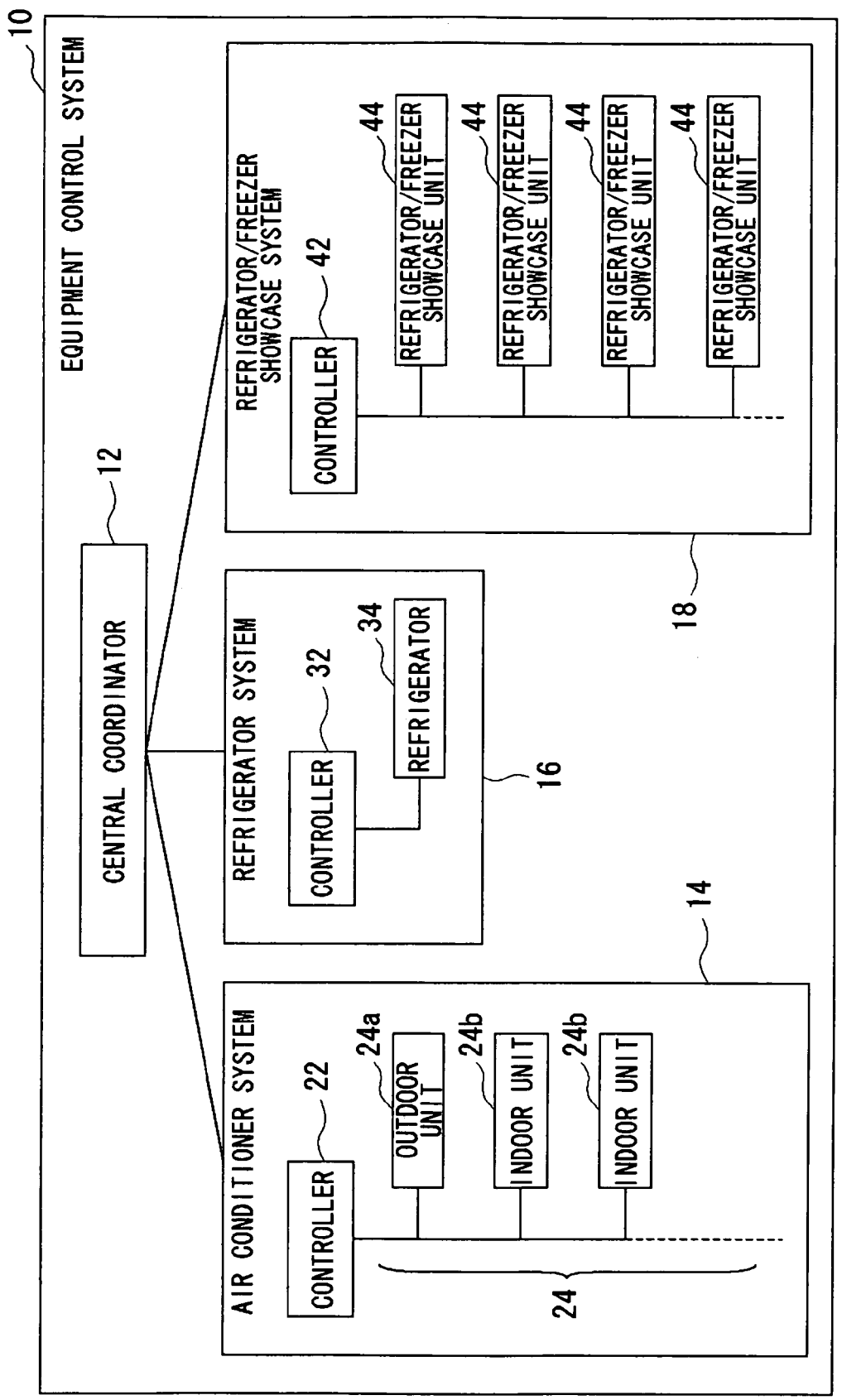
FIG. 1 illustrates the structure of an equipment control system according to a first embodiment of the present invention.

FIG. 1 illustrates the structure of an equipment control system 10 according to a first embodiment of the present invention. The equipment control system 10 comprises an air conditioner system 14 for conditioning air in a shop or a facility, a refrigerator/freezer showcase system 18 for displaying articles for sale such as food, and a refrigerator system 16 for controlling the pressure, temperature and the like of a refrigerant for cooling the air used in the refrigerator/freezer showcase system 18. The equipment control system 10 also comprises a central coordinator 12 for coordinating the air conditioner system 14, the refrigerator system 16 and the refrigerator/freezer showcase system 18.

The air conditioner system 14 comprises an air conditioner 24 comprised of an outdoor unit 24a and a plurality of indoor units 24b, and a controller 22 connected to the outdoor unit 24a and the indoor units 24b. The air conditioner 24 performs air conditioning such as air distribution, cooling and heating to actively regulate the room temperature of a shop and a facility.

The refrigerator system 16 comprises a refrigerator 34 and a controller 32 connected to the refrigerator 34. The refrigerator 34 is an ordinary refrigerator comprising a compressor, a condenser and an evaporator. The refrigerator 34 cools the cooling air in cooperation with an expansion valve of the refrigerator/freezer showcase unit 44 described later.

The refrigerator/freezer showcase system 18 comprises a plurality of refrigerator/freezer showcase units 44 and a controller 42 connected to the refrigerator/freezer showcase units 44. The refrigerator system 16 and the refrigerator/freezer showcase system 18 cooperate with each other to regulate the temperature in a refrigerator/freezer showcase. More particularly, the refrigerator system 16 is provided with the structure illustrated in FIG. 2.

Figure 2:
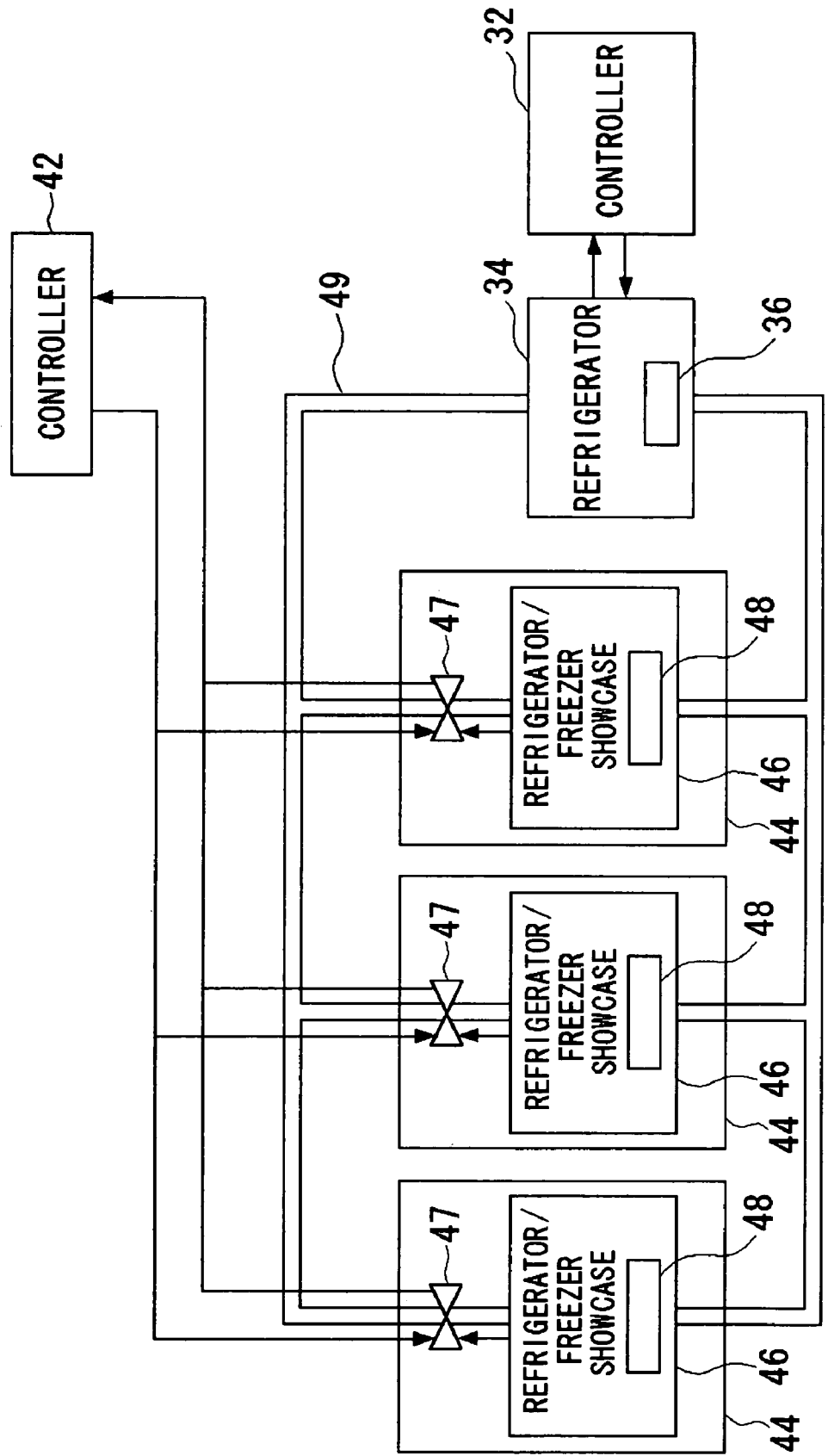
FIG. 2 illustrates the structure of refrigeration facilities comprising a refrigerator/freezer showcase unit and a refrigerator.

FIG. 2 illustrates the structure of refrigeration facilities comprising the refrigerator/freezer showcase units 44 and the refrigerator 34. The refrigerator 34 and the refrigerator/freezer showcase units 44 communicate with each other via a common refrigerant pipe 49. A refrigerant is exchanged between the refrigerator 34 and the refrigerator/freezer show case units 44 via the common refrigerant pipe 49.

The refrigerator 34 comprises a condensation temperature sensor 36 for detecting the condensation temperature of the refrigerant. The result of detection by the condensation temperature sensor 36 is sent to the controller 32. The refrigerator/freezer showcase unit 44 comprises a refrigerator/freezer showcase 46 in which articles for sale such as food are displayed and cooled by the cooling air, an inside temperature sensor 48 for detecting the temperature inside the refrigerator/freezer showcase 46 and an expansion valve 47 fitted to the common refrigerant pipe 49 between the refrigerator 34 and the refrigerator/freezer showcase 46. While the refrigerator/freezer showcase 46 and the expansion valve 47 of FIG. 2 are illustrated in isolation for convenience, they are actually integrally formed.

The expansion valve 47 is provided with the function of regulating the flow rate of refrigerant exchanged between the refrigerator 34 and the refrigerator/freezer showcase unit 44 via the common refrigerant pipe 49. The refrigerant supplied from the refrigerator 34 is led to the refrigerator/freezer showcase 46 via the common refrigerant pipe 49 with the flow rate of the refrigerant being regulated by the expansion valve 47. The refrigerant led to the refrigerator/freezer showcase 46 cools the cooling air used in the refrigerator/freezer showcase 46. The refrigerator/freezer showcase 46 is provided with the function of controlling the opening and closing of the expansion valve 47, based on a difference between the cooling air temperature and a preset temperature. The expansion valve 47 is not opened only in accordance with a request from the refrigerator/freezer showcase 46 but is opened in response to a gate signal, i.e., a valve opening control signal, from the controller 42. When the refrigerator 34 detects a change in refrigerant pressure due to the opening action of the expansion valve 47, the refrigerator 34 drives the compressor so as to supply the refrigerant to the refrigerator/freezer showcase 46 coupled to the opened valve.

In the air conditioner system 14, the refrigerator system 16 and the refrigerator/freezer showcase system 18, the electric equipment including the air conditioner 24, the refrigerator 34 and the refrigerator/freezer showcase unit 44 constitute an equipment group that affects the room temperature of a shop or a facility depending on their operating conditions. The layout of the electric equipment is as illustrated in FIG. 3.

Figure 3:
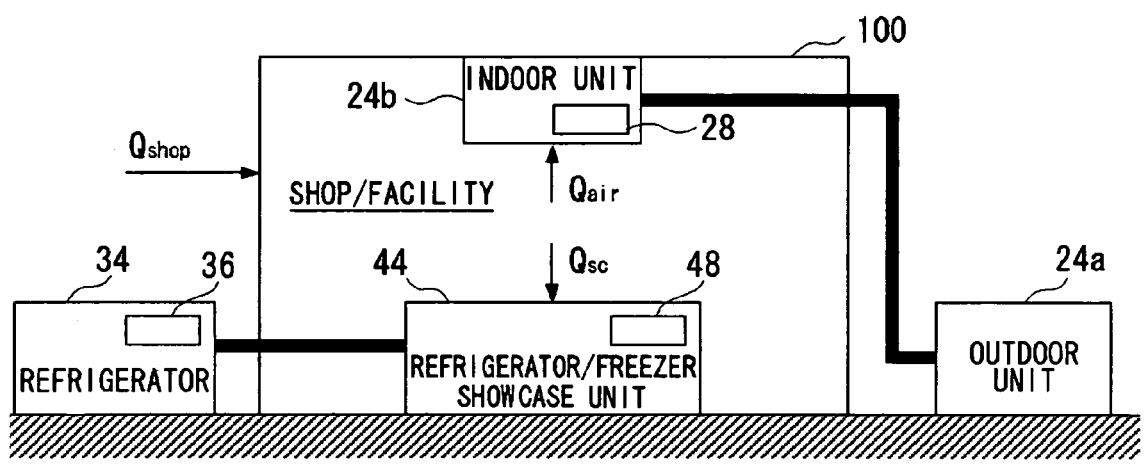
FIG. 3 illustrates the layout of electric equipment in a shop or a facility.

FIG. 3 illustrates the layout of electric equipment in a shop or a facility (hereinafter, denoted as shop/facility) 100. Inside the shop/facility 100 are installed the indoor unit 24b provided with an inhalation temperature sensor 28, and the refrigerator/freezer showcase unit 44 provided with the inside temperature sensor 48. The inhalation temperature sensor 28 detects the temperature of air in the vicinity of an inlet of the indoor unit 24b and transmits the result of detection to the controller 22. Outside the shop/facility 100 are installed the refrigerator 34 connected to the refrigerator/freezer showcase unit 44 and provided with the condensation temperature sensor 36, and the outdoor unit 24a connected to the indoor unit 24b. $Q_{shop}$ in FIG. 3 indicates heat load infiltrating the interior of the shop/facility 100 from outside, $Q_{air}$ indicates the amount of heat handled by the indoor unit 24b, and $Q_{sc}$ indicates heat load infiltrating the refrigerator/freezer showcase 46.

Figure 4:
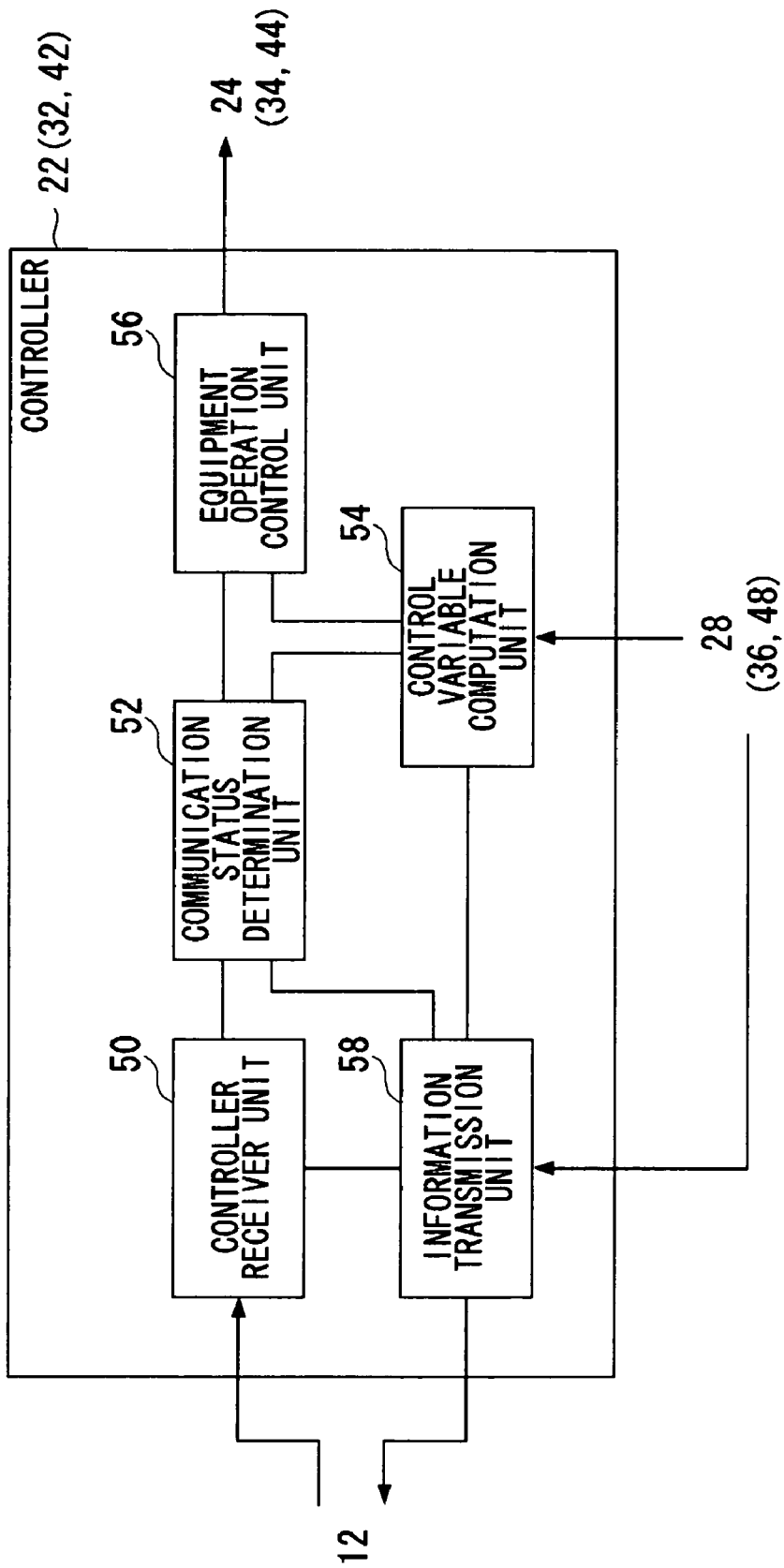
FIG. 4 is a block diagram illustrating the functions primarily related to the control of an air conditioner, which are among the functions provided in an air conditioner system according to the first embodiment.

The controllers 22, 32 and 42 of the air conditioner system 14, the refrigerator system 16 and the refrigerator/freezer showcase system 18 control the corresponding electrical equipment, based on control data computed by the central coordinator 12. Each of the controllers 22, 32 and 42 is provided with the function of controlling the corresponding electric equipment, based on the control data computed by the central integrator 12, and the function of controlling the corresponding electric equipment, based only on the status data of the electric equipment subject to the controller's control and without depending on the control data transmitted from the central coordinator 12. More specifically, each of the controllers 22, 32 and 42 is provided with the functions illustrated in FIG. 4. FIG. 4 illustrates the controller 22 of the air conditioner system 14 by way of example.

FIG. 4 is a block diagram illustrating the functions primarily related to the control of the air conditioner 24, which are among the functions provided in the controller 22 of the air conditioner system 14 according to the first embodiment. The controller 22 of the air conditioner system 14 comprises a controller receiver unit 50, a communication status determination unit 52, a control variable computation unit 54, an equipment operation control unit 56 and an information transmitting unit 58.

The controller receiver unit 50 receives a signal from the central coordinator 12. The communication status determination unit 52 detects the status of communication with the central coordinator 12 so as to determine whether communication with the central coordinator 12 is enabled. The communication status determination unit 52 refers to the result of detection of the status of communication with the central coordinator 12 and determines whether to control the air conditioner 24, based on the control data sent from the central coordinator 12 or to control the air conditioner 24, based only on the status data of the air conditioner 24 and without depending on the control data transmitted from the central coordinator 12.

When it is determined in the communication status determination unit 52 that proper communication status is difficult to establish between the central coordinator 12 and the controller 22, the control variable computation unit 54 computes the control data of the air conditioner 24. More specifically, the control variable computation unit 54 computes the control data of the air conditioner 24, based on the result of detection by the inhalation temperature sensor 28, the actual status of control of the air conditioner 24 by the equipment operation control unit 56. The control variable computation 54 transmits the computed control data to the equipment operation control unit 56.

The equipment operation control unit 56 controls the air conditioner 24, based on the control data transmitted from the central coordinator 12 or the control data transmitted from the control variable computation unit 54.

The information transmitting unit 58 transmits the result of detection of temperature at the inlet by the inhalation temperature sensor 28, various data related to the control of the air conditioner 24 transmitted from the control variable computation unit 54 and the equipment operation control unit 56, data sent from the controller receiver unit 50 and the like to the central coordinator 12, as the status data related to the air conditioner 24.

The controller 32 of the refrigerator system 16 and the controller 42 of the refrigerator/freezer showcase system 18 also have a similar structure as the controller 22 of the air conditioner system 14 illustrated in FIG. 4. Similarly to the controller 22 of the air conditioner system 14, the controller 32 of the refrigerator system 16 and the controller 42 of the refrigerator/freezer showcase system 18 control the corresponding electric equipment, based on the control data computed by the central coordinator 12 and the control variable computation unit 54. The controllers 32 and 42 also transmit the status data related to the refrigerator 34 and the status data related to the refrigerator/freezer showcase unit 44, respectively, to the central coordinator 12.

The "status data" referred to in this embodiment includes the quantity indicating the status of control of the electric equipment controlled by the controllers 22, 32 and 42 and also includes the quantity detected by the sensors provided in the electric equipment. For example, the status data related to the air conditioner 24 may include the temperature of air in the vicinity of the inlet detected by the inhalation temperature sensor 28, the operating mode managed by the controller 22, a preset air conditioning temperature, information on malfunction of the air conditioner 24 or information on malfunction of communication. The status data related to the refrigerator 34 may include the condensation temperature of a refrigerant detected by the condensation temperature sensor 36, information on malfunction of the refrigerator 34 managed by the controller 32 or information on malfunction of communication. The status data related to the refrigerator/freezer showcase unit 44 may include the inside temperature detected by the inside temperature sensor 48, an inside difference temperature, which is a difference between a preset temperature and the inside temperature, information on defrosting operation managed by the controller 42, information on malfunction of the refrigerator/freezer showcase The central coordinator 12 illustrated in FIG. 1 functions as a supervisor that supervises the controllers 22, 32 and 42. More specifically, the central coordinator 12 uses the status data of the electric equipment transmitted from the controllers 22, 32 and 42 to compute the control data for controlling the controllers 22, 32 and 42 and transmit the computed control data to the controllers. The central coordinator 12 is provided with the function of computing the control data for controlling each of the controllers 22, 32 and 42, based on the status data of the corresponding electric equipment and the status data of at least another of electric equipment. The central coordinator 12 is also provided with the function of computing the control data of each of the controllers, based only on the status data of the corresponding electric equipment. More specifically, the central coordinator 12 is provided with the functions as illustrated in FIGS. 5 and 6.

Figure 5:
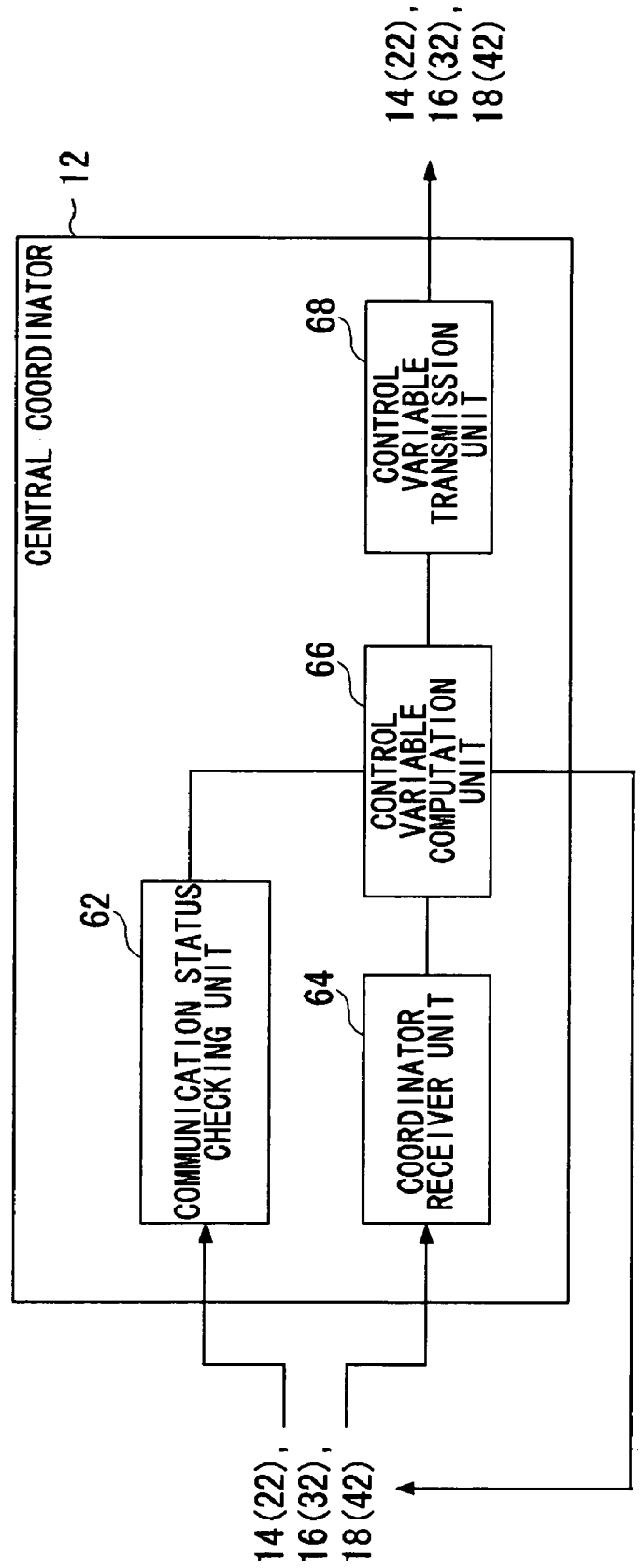
FIG. 5 is a block diagram illustrating the functions primarily related to the control of an air conditioner, which are among the functions provided in a central coordinator according to the first embodiment.
Figure 6:
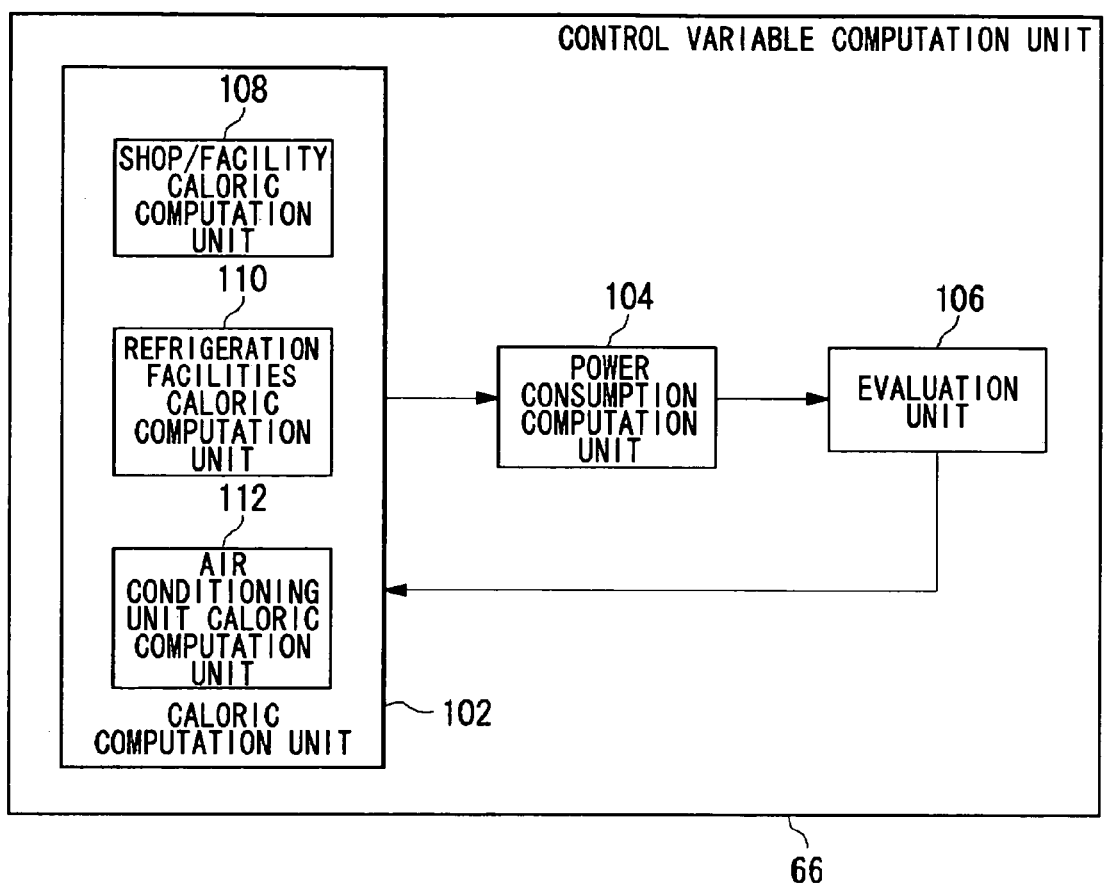
FIG. 6 is a block diagram illustrating the functions related to operations in a control variable computation unit of the central coordinator.

FIG. 5 is a block diagram illustrating the functions primarily related to the control of the air conditioner 24, which are among the functions provided in the central coordinator 12 according to the first embodiment. The central coordinator 12 comprises a communication status checking unit 62, a coordinator receiver unit 64, a control variable computation unit 66 and a control variable transmission unit 68.

The communication status checking unit 62 detects the status of communication with the air conditioner system 14, the refrigerator system 16 and the refrigerator/freezer showcase system 18. In this embodiment, communication occurs between the controllers 22, 32 and 42 and the communication status checking unit 62. The communication status checking unit 62 determines whether communication with the controllers 22, 32 and 42 is enabled.

The coordinator receiver unit 64 receives the status data of the electric equipment transmitted from the controllers 22, 32 and 42 and transmits the received data to the control variable computation unit 66.

The control variable computation unit 66 computes the control data for the controllers 22, 32 and 42, based on the result of detection by the communication status checking unit 62, the status data received by the coordinator receiver unit 64 and the like. The control variable computation unit 66 determines whether to compute the control data for each the controllers 22, 32 and 42, based on the status data of the corresponding electric equipment and the status data of at least another of electric equipment, or to compute the control data for each the controllers 22, 32 and 42, based only on the status data of the corresponding electric equipment. The control variable computation unit 66 determines the method of computing the control data for the controllers 22, 32 and 42, based, for example, on the result of checking by the communication status checking unit 62 and the result of simulation-based computation of energy efficiency described later. The control variable computation unit 66 computes the control data for the controllers 22, 32 and 42, based on the various functions illustrated in FIG. 6 described later.

The control variable transmission unit 68 transmits the control data for the controllers 22, 32 and 42 computed by the control variable computation unit 66 to the respective controllers.

FIG. 6 is a block diagram illustrating the functions primarily related to operations in the control variable computation unit 66 of the central coordinator 12. The control variable computation unit 66 of the central coordinator 12 is provided with a caloric computation unit 102, a power consumption computation unit 104 and an evaluation unit 106. The caloric computation unit 102 comprises a shop/facility caloric computation unit 108 for computing infiltration heat load $Q_{shop}$ on the shop/facility 100, a refrigeration facilities caloric computation unit 110 for computing infiltration heat load $Q_{sc}$ on the refrigerator/freezer showcase 46, and an air conditioning equipment caloric computation unit 112 for computing heat quantity $Q_{air}$ handled by the air conditioning equipment. An example of specific method of computation will be given below.

(1) Computation of Infiltration Heat Load $Q_{shop}$ on Shop/Facility

The shop/facility caloric computation unit 108 presets an indoor temperature/humidity condition and computes the infiltration heat load $Q_{shop}$ infiltrating the shop/facility at a given time, by referring to environmental conditions imposed on the shop/facility such as room temperature and moisture inside the shop/facility, outside temperature and moisture, the areas of outer walls and windows, and lighting equipment. Setting of a sampling time will be described later.

<Calculation>

*Infiltration heat load on shop/facility:$Q_{shop}$[kcal/h]
=indoor heat load[kcal/h]+outdoor heat load [kcal/h]

(Indoor Heat Load)

Given as a total of the following heat loads.

*Solar radiation heat(glass part)[kcal/h]=$A \times S \times SC$ where A: glass surface area [m²], S: standard incident insolation [kcal/(m²·h)], SC: shielding coefficient

*Conductive heat+radiant heat(outer wall, roof)[kcal/h]:$A \times K \times ETD$ where A: area of wall/roof[m²], K: coefficient of overall heat transmission[kcal/(m²·h·° C.)], ETD: effective temperature difference[° C.]

*Conductive heat(other than roof; glass, partitions, etc.)[kcal/h]:$A \times K \times T$ where A: area of wall/roof[m²], K: coefficient of overall heat transmission[kcal/(m²·h·° C.)], T: temperature difference between indoor and outdoor [° C.]

Internally generated heat (human body)[kcal/h]:$m \times q$ where m: number of people, q: quantity of heat generated per human body[kcal/(h·number of people)]=102

Internally generated heat (lighting (fluorescent lighting) [kcal/h]: Wattage[$W$]·1.08

(Outdoor air load): for air change, air change rate method: [kcal/h]

$0.28 \times n \times V \times (t1-t2) + 720 \times n \times V \times (x1-x2)$ where n: number of times [frequency of air change/h], V: volume of shop/facility[m³], t1, t2: indoor and outdoor temperature [° C.], x1, x2: absolute indoor and outdoor moisture [kg/kg']

(2) Computation of Infiltration Heat Load $Q_{sc}$ on Refrigerator/Freezer Showcase The refrigeration facilities caloric computation unit 110 computes the heat load infiltrating the refrigerator/freezer showcase, i.e. the handled heat load $Q_{sc}$, for each preset room temperature and humidity. The refrigeration facilities caloric computation unit 110 focuses on variation in sensible heat and latent heat of the air cooled in the refrigerator/freezer showcase, so as to compute the sensible heat quantity and latent heat quantity handled by the refrigerator/freezer showcase (refrigerator), from the quantity of air infiltrating the refrigerator/freezer showcase, room air temperature and humidity, and the temperature of the cooling air in the cooler of the refrigerator/freezer showcase, and to compute a total of the sensible heat and the latent heat. The refrigeration facilities caloric computation unit 110 further computes the heat quantity required to melt the frost in the cooler of the refrigerator/freezer showcase.

The cooler (not shown) of the refrigerator/freezer showcase unit 44 removes the sensible heat and latent heat of the moist air in the room. More specifically, the cooler 1) removes sensible heat from dry air and water vapor (including water and ice after phase change) and 2) removes latent heat required for phase change of water vapor. In the case of freezer showcase, the temperature of cooling air drops below 0[° C.]. Therefore, the removal of latent heat to initiate a phase change in moisture in the air is required while the room temperature is cooled to the temperature of the cooling air. In the required phase change, water vapor is changed to water (dew point reached: removal of heat of condensation) and then to ice (melting point reached: removal of heat of solidification). In the process of cooling the room temperature to the temperature of the cooling air, the sensible heat of moisture as condensed (water) and solidified (ice) inside the cooler is removed. Thus the sensible heat [kJ/kg] and the latent heat [kJ/kg] are computed as follows.

<Computation Parameters>

The temperature ts[° C.] and relative humidity $\phi s$[%] of the room air are preset as initial computing conditions. With this, the absolute humidity xs[kg/kg'] and dew point td[° C.] of the room air are determined.

The absolute humidity xr[kg/kg'] of the cooling air of the refrigerator/freezer showcase is determined from the temperature tr[° C.] of the refrigerator/freezer showcase preset as the initial computing condition and from the absolute humidity xs mentioned above.

The quantity of water ultimately forming frost inside the cooler: xs−xr [kg/kg']

The quantity of air infiltrating the refrigerator/freezer showcase $G_{in}$[kg/h]: preset as initial computing condition Freezing temperature of water: tm=0[° C.]

$C_{pa}$: average isopiestic specific heat of dry air [kJ/(kg·K)] =1.005

$C_{pv}$: average isopiestic specific heat of water vapor [kJ/(kg·K)]=1.859

$C_{pw}$: average isopiestic specific heat of water [kJ/(kg·K)] =4.186

$C_{pi}$: average isopiestic specific heat of ice [kJ/(kg·K)] =2.093

<Computational Expression> a) Expression for Computing Sensible Heat a-1) Moist Air $Q_{a1}$[kJ/h]=$G_{in} \times C_{ps} \times (ts-td)$ before water condensation $Q_{a2}$[kJ/h]=$G_{in} \times C_{pr} \times (td-tr)$ after water condensation isopiestic specific heat of air before water condensation [kJ/(kg·K)]:$C_{ps}$[kJ/(kg·K)]

$$\rightarrow C_{ps} = \frac{(C_{pa} + C_{pv} \times xs)}{(1+xs)}$$

isopiestic specific heat of air after water condensation[kJ/(kg·K)]:$C_{pr}$[kJ/(kg·K)]

$$\rightarrow C_{pr} = \frac{(C_{pa} + C_{pv} \times xr)}{(1+xr)}$$

a-2) Water $Q_w$[kJ/h]=$G_{in} \times (xs-xr) \times C_{pw} \times (td-tm)$ a-3) Ice $Q_i$[kJ/h]=$G_{in} \times (xs-xr) \times C_{pi} \times (tm-tr)$ $Q_{a2}$ is computed on the condition that td>tr, i.e., that moisture is condensed. Similarly, $Q_i$ shown in a-3) is computed when ice is formed.

b) Expression for Computing Latent Heat

Heat of condensation: $Q_e$[kJ/h]:

$$Q_e = G_{in} \times \left(\left(\frac{xs}{1+xs}\right) - \left(\frac{xr}{1+xr}\right)\right) \times h_e$$

Heat of condensation at td: [kJ/kg]:$h_e$=2501−2.34×td

Heat of solidification: $Q_m$[kJ/h]

$$Q_m = G_{in} \times \left(\left(\frac{xs}{1+xs}\right) - \left(\frac{xr}{1+xr}\right)\right) \times h_m$$

Heat of solidification at tm (=0[° C.]) [kJ/kg]:hm=334.9

From the above, the heat load $Q_{sc}$ on the refrigerator/freezer showcase is given as follows. In the case of refrigerator showcase, tr>tm. Therefore, $Q_i=Q_m=0$.

$Q_{SC}$[kJ/h]=$Q_{a1}+Q_{a2}+Q_w+Q_i+Q_e+Q_m$

The heat quantity $Q_{df}$ required to defrost the cooler is given by $Q_{df}=Q_i+Q_m$ (only in the case of freezer showcase)

(3) Computation of Heat Load $Q_{air}$ Handled by Air Conditioning Equipment

The air conditioning unit caloric computation unit 112 computes, for each preset room temperature and humidity, the heat load $Q_{air}$ as a difference between the infiltration heat load on the shop/facility and the heat load on the refrigerator/freezer showcase.

Infiltration heat load on shop/facility: 4.186×$Q_{shop}$[kJ/h]

Infiltration heat load on refrigerator/freezer showcase: $Q_{sc}$ [kJ/h]

Heat load handled by air conditioning equipment: $Q_{air}$[kJ/h]=4.186×$Q_{shop}$[kJ/h]−$Q_{sc}$[kJ/h]

(4) Computation of Power Consumption in Equipment

The power consumption unit 104 refers to the heat load handled by the equipment and the coefficients of performance (COP) of the equipment so as to compute the power consumption required to handle the heat load. In this process, the power consumption of the whole equipment is computed, allowing for the power to drive the fans of the equipment, lighting power, etc. By computing the amount of frost in the cooler of the refrigerator/freezer showcase and the amount of heat necessary for melting, the heater power specific to a refrigerator showcase is computed. When other equipment is located in the shop/facility, the power consumption of the other equipment may be added to the power consumption computed below, so as to obtain the power consumption of the shop/facility as a whole.

The power consumption of equipment is given as a total of the following three categories of power consumption.

a) Power Consumption Required to Handle Heat Load

The power consumption in the equipment is computed from the heat load handled by the equipment and the rated coefficients of performance (COP) of the equipment.

a-1) In the Case of Air Conditioning Equipment (COP of Outdoor Unit: COPa)

Power consumption[kW]=$Q_{air}$[kJ/h]/(COPa×3600)

a-2) In the case of refrigerator/freezer showcase (COP of refrigerator: COPs)

Power consumption$[kW]=Q_{sc}$[kJ/h]$/(COPs \times 3600)$ b) Power Consumption of Defrost Heater of Refrigerator/Freezer Showcase (COP of Heater: COPd)

The power consumption of a heater is computed from the heat quantity necessary for defrosting in the cooler and the rated COP of the heater.

Power consumption$[kW]=Q_{df}/(COPd \times 3600)$

The heat quantity necessary for defrosting in the cooler:

$Q_{df}=Q_i+Q_m$ c) Other Power Consumption (Equipment Power Consumption not Related to Heat Load)

This refers to power consumption not related to the heat load handled by the equipment. For example, the rated power consumption value of the equipment is used.

In the case of air conditioner

Power consumption of indoor unit fan and outdoor unit fan
In the case of refrigerator/freezer showcase Refrigerator/freezer showcase main body: power consumption of inside fan, lighting, etc.

Figure 8:
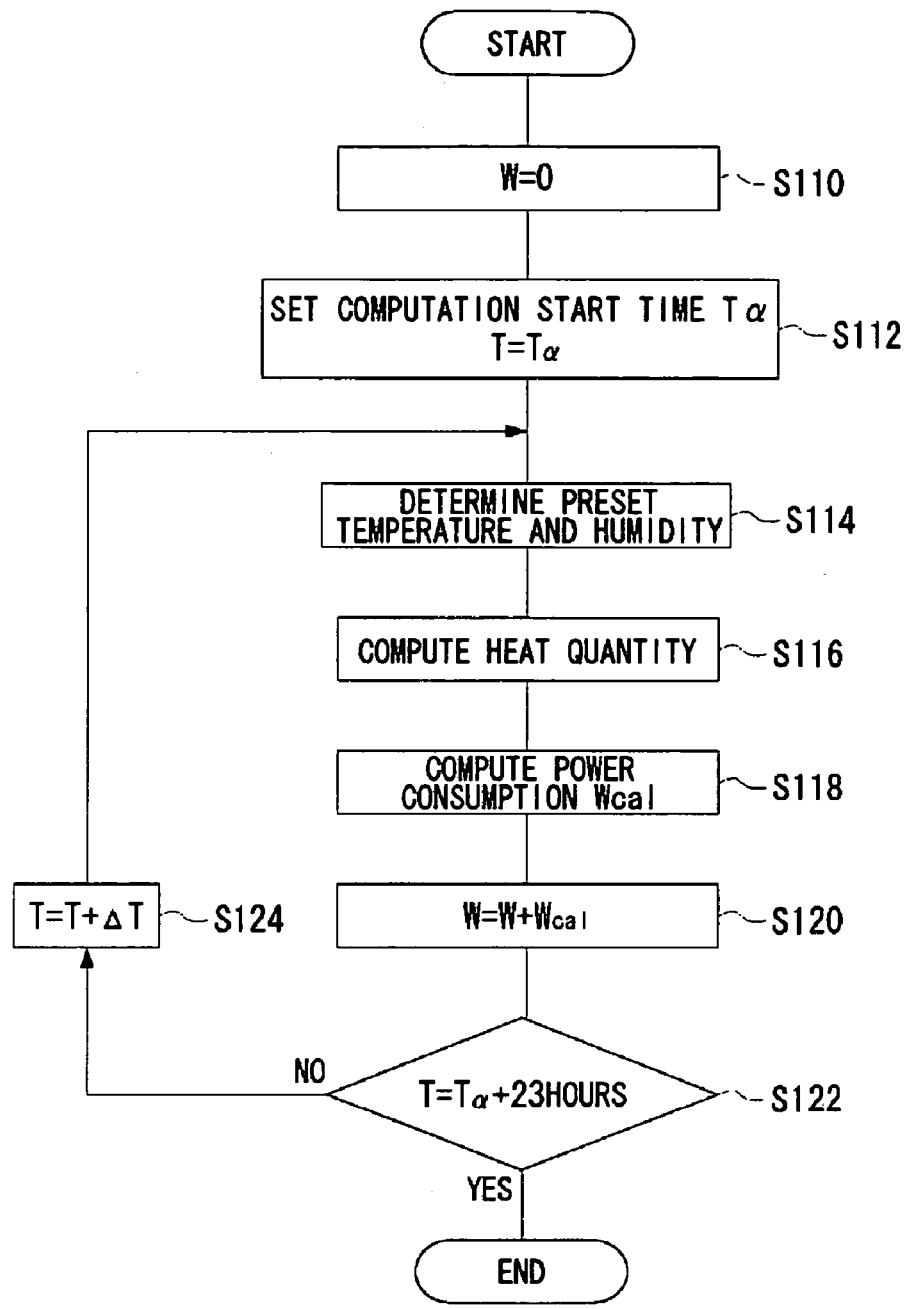
FIG. 8 is a flowchart for evaluation of power consumption over a predetermined interval.

Refrigerator: power consumption of fan, etc.
In the case of ceiling area lighting Power consumption for lighting (5) Evaluation of Power Consumption The evaluation unit 106 evaluates the power consumption of the equipment from the power consumption computed in the power consumption unit 104 and the duration of use. The evaluation unit 106 computes the transition over a certain period of the heat load and power consumption in the shop and the equipment. More specifically, the computations (1)-(4) above are carried out at regular intervals defined by the sampling time, so as to compute the transition in heat load, power consumption and the like over a predetermined period such as several hours and one day. The transition is computed under different conditions in which the preset temperature and humidity of the air conditioning equipment, and the preset temperature of the cooling air in the refrigerator/freezer showcase are changed each hour. The energy saving performance is evaluated for the preset values of the equipment as they are changed on an hourly basis, based on the total power consumption. The specific flow for evaluation of power consumption over a predetermined period of time is as illustrated in FIG. 8 described later.

The control variable computation unit 66 assesses the energy saving performance, based on the result of simulation-based computation described above for determining the energy efficiency. The control variable computation unit 66 determines whether to compute the control data for each of the controllers 22, 32 and 42, based on the status data of the corresponding electric equipment and the status data of at least another of electric equipment, or to compute the control data for each of the controllers 22, 32 and 42, based only on the status data of the corresponding electric equipment.

The functions of the controllers 22, 32 and 42 and the central coordinator 12 illustrated in FIGS. 4 through 6 may be implemented by a CPU, a memory, a program loaded into the memory and the like. The program may be built in the controllers 22, 32 and 42 and the central coordinator 12 or supplied from an external source in the form of a recording medium. Therefore, it will be obvious to those skilled in the art that the functions of the controllers 22, 32 and 42 and the central coordinator 12 can be implemented in a variety of manners including hardware only, software only or a combination of both. The controllers 22, 32 and 42 and the central coordinator 12 may be provided as dedicated terminals or general-purpose equipment such as a personal computer that functions as designed by having a predetermined program downloaded therein. The controllers 22, 32 and 42 may be integrally formed with the electric equipment subject to control. Alternatively, portions of the electric equipment subject to control may serve as the controllers 22, 32 and 42.

Detection of the communication status by the communication status determination unit 52 and the communication status checking unit 62 may be performed by an arbitrary method. For example, the status of communication between the communication status checking unit 62 and the controllers 22, 32 and 42 may be determined by transmitting a checking instruction signal from the communication status checking unit 62 to the controllers 22, 32 and 42 and determining whether an acknowledge signal is returned from the controllers 22, 32 and 42.

As described, modes of controlling the electric equipment by the controllers 22, 32 and 42 are divided into a local control mode and a cooperative control mode. The term "local control mode" refers to a mode whereby the controller controls the corresponding electrical equipment, based on the control data derived only from the status data of the electric equipment subject to the controller's control. The term "cooperative control mode" refers to a mode whereby the controller controls the corresponding electrical equipment, based on the status data of the electric equipment subject to the controller's control and the status data of at least another of electric equipment.

Each of the controllers 22, 32 and 42 operates the corresponding electric equipment efficiently in the local control mode or the cooperative control mode described above. For example, the controller 22 of the air conditioner system 14 operated in the local control mode is capable of launching normal cooling and heating operation in which only the operating efficiency of the system 14 is considered. In contrast, in the cooperative control mode, the controller 22 is capable of using a portion of waste heat from the refrigerator 34 in the heating mode to heat the shop/facility. The controller 22 is also capable of using the cooling capability of the air conditioner 24 in the cooling mode to assist the operation of the refrigerator 34. The controller 22 operated in the cooperative control mode during summer is capable of preventing the inside temperature of the refrigerator/freezer showcase 46 from increasing, by maintaining the room temperature of the shop/facility 100 at a low level by cooling it using the air conditioner 24.

The controller 32 of the refrigerator system 16 in the local control mode can control the pressure of refrigerant so that the refrigerant evaporation temperature at the lower pressure side is controlled to a predetermined level. In the cooperative control mode, the controller 32 is capable of controlling the temperature of refrigerant so that the preset refrigerant evaporation temperature value of the refrigerator 34 at the lower pressure side to be higher, when the difference temperature in the refrigerator/freezer showcase 46 as detected is small than a predetermined value. That is the controller 32 controls the preset refrigerant evaporation temperature value at the lower pressure side to be higher by a predetermined amount, when the difference temperature in the refrigerator/freezer showcase 46 <predetermined value. The predetermined value is a negative value indicating excessive cooling with reference to the preset value. The difference temperature in the refrigerator/freezer showcase 46 is a difference between the preset temperature and the inside temperature. For example, a moving average over a predetermined period, such as 30 minutes, is used. When there are a plurality of refrigerator/freezer showcases 46 connected to the common refrigerant pipe 49 and cooled by the refrigerator 34, a maximum of the difference temperature of the refrigerator/freezer showcase 46 is determined by a search. The maximum deviation represents a difference temperature value used in the comparison to determine if "difference temperature <predetermined value". Comparison between the difference temperature of the refrigerator/freezer showcase 46 with the predetermined value is made such that, when the mode of operation of the refrigerator/freezer showcase 46 is the defrosting mode, or a prescribed time (for example, 30 minutes) has not elapsed since the mode of operation shifted to the cooling operation, the difference temperature of the refrigerator/freezer showcase 46 is not made the subject of search mentioned above so as to prevent the energy saving operation of the refrigerator 34 from being affected by the deviation. If it found that "difference temperature <predetermined value", energy saving operation is performed. The use of a maximum value as the difference temperature in the comparison to determine if "difference temperature <predetermined value" is described by way of example only. The difference temperature of the refrigerator/freezer showcase may be selected in accordance with other conditions for evaluation. By setting the preset refrigerant evaporation temperature value of the refrigerator 34 at the lower pressure side to be higher by a predetermined amount, coordinated operation of the refrigerator/freezer showcase 46 and the refrigerator 34 is achieved.

The above-described ways of control in the local control mode and the cooperative control mode are by way of example only. The local control mode and/or the cooperative control mode may be achieved in a variety of other ways.

A description will now be given of the operation according to the first embodiment. The operation of the equipment as a whole constituting the equipment control system 10 will be described with reference to FIG. 7. The control of the refrigerator/freezer showcase unit 44 is illustrated in FIG. 7 by way of illustrating the operation of the equipment as a whole.

Figure 7:
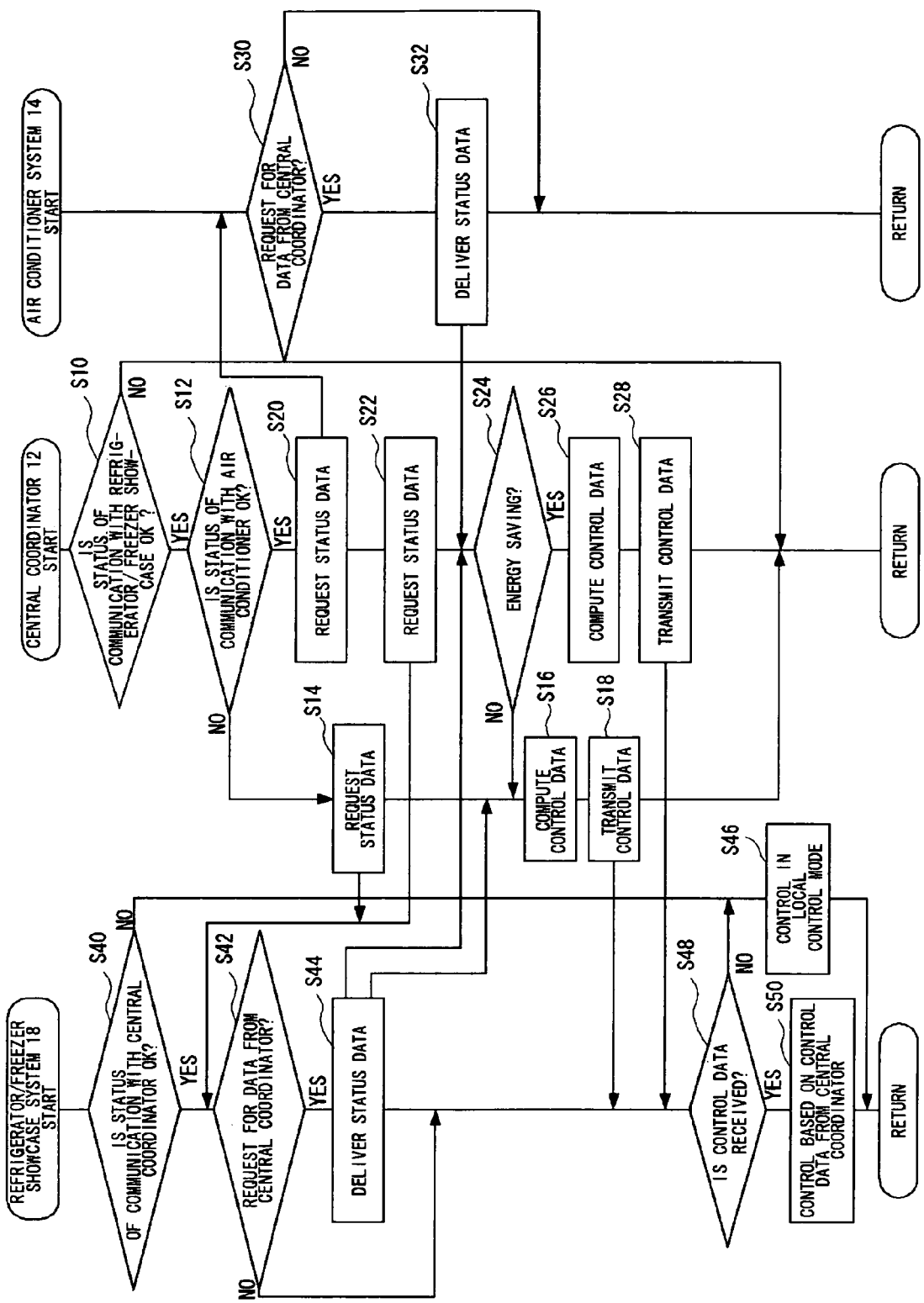
FIG. 7 is a flowchart illustrating the overall flow of control of the refrigerator/freezer showcase unit according to the first embodiment.

FIG. 7 is a flowchart illustrating the overall flow of control of the refrigerator/freezer showcase unit 44 according to the first embodiment. FIG. 7 illustrates a case where the refrigerator/freezer showcase system 18 is controlled, allowing for the status data of the air conditioner 24 of the air conditioner system 14.

The status of communication between the controller 42 of the refrigerator/freezer showcase system 18 and the central coordinator 12 is determined by the communication status checking unit 62 of the central coordinator 12 (S10 of FIG. 7). When it is determined that proper communication status is not established between the controller 42 and the central coordinator 12 (NO in S10), the central coordinator 12 terminates the current process and proceeds to a subsequent process, whereupon the status of communication with the controller 42 is examined again. When it is determined that proper communication status is established between the controller 42 and the central coordinator 12 (YES in S10), the status of communication between the controller 22 of the air conditioner system 14 and the central coordinator 12 is determined by the communication status checking unit 62 of the central coordinator 12 (S12).

When it is determined that proper communication status is not established between the controller 22 and the central coordinator 12 (NO in S12), the control variable computation unit 66 of the central coordinator 12 requests the controller 42 of the refrigerator/freezer showcase system 18 to transmit the status data of the refrigerator/freezer showcase unit 44 to the central coordinator 12 (S14) The control variable computation unit 66 computes the control data for the controller 42, based only on the status data of the refrigerator/freezer showcase unit 44 transmitted from the controller 42 (S16). The control data for the controller 42 thus computed is transmitted by the control variable transmission unit 68 of the central coordinator 12 to the controller 42 of the refrigerator/freezer showcase system 18 (S18). The central coordinator 12 terminates the current process and proceeds to a subsequent process, whereupon the status of communication with the controller 42 is checked again.

When it is determined that proper status of communication is established between the controller 22 and the central coordinator 12 (YES in S12), the control variable computation unit 66 of the central coordinator 12 requests the controller 22 of the air conditioner system 14 to transmit the status data of the air conditioner 24 to the central coordinator 12 (S20) and requests the controller 42 of the refrigerator/freezer showcase system 18 to transmit the status data of the refrigerator/freezer showcase unit 44 to the central coordinator 12 (S22). The controller receiver unit 50 of the controller 22 of the air conditioner system 14 determines whether a request for transmitting the status data of the air conditioner 24 is received (S30). When the request for transmission is received (YES in S30), the information transmission unit 58 of the controller 22 transmits the status data of the air conditioner 24 to the central coordinator 12 (S32). The controller 22 terminates the current process and proceeds to a subsequent process, whereupon a determination is made again as to whether the request for transmitting the status data of the air conditioner 24 is received. When the request for transmission is not received (NO in S30), the controller receiver unit 50 of the controller 22 determines again whether the request for transmitting the status data of the air conditioner 24 is received. Similarly, the controller receiver 50 of the controller 42 of the refrigerator/freezer showcase system 18 determines whether the request for transmitting the status data is received (S42). When the request for transmission is received (YES in S42), the information transmission unit 58 of the controller 42 transmits the status data of the refrigerator/freezer showcase unit 44 to the central coordinator 12 (S44). When the controller receiver unit 50 of the controller 42 does not receive the request for transmission (NO in S42), the controller 42 proceeds to a subsequent process.

When the coordinator receiver unit 64 of the central coordinator 12 receives the status data of the air conditioner 24 and the status data of the refrigerator/freezer showcase unit 44 in response to the request for transmission (S20 and S22), the control variable computation unit 66 of the central coordinator 12 determines which of a first and second modes of computation better serves the energy-saving purpose, i.e., the first mode whereby the control data for the controller 42 of the refrigerator/freezer showcase system 18 is computed, based on the status data of the air conditioner 24 and the status data of the refrigerator/freezer showcase unit 44, and the second mode whereby the control data for the controller 42 of the refrigerator/freezer showcase system 18 is computed, based only on the status data of the refrigerator/freezer showcase unit 44 (S24).

When the second mode whereby the control data for the controller 42 of the refrigerator/freezer showcase system 18 is computed, based only on the status data of the refrigerator/freezer showcase unit 44 is determined to be better in energy-saving performance (NO in S24), the control variable computation unit 66 computes the control data for the controller 42, based only on the status data of the refrigerator/freezer showcase unit 44 (S16) and transmits the computed data to the controller 42 of the refrigerator/freezer showcase system 18 (S18). The central coordinator 12 terminates the current process and proceeds to a subsequent process, whereupon the status of communication with the controller 42 is checked again. In contrast, when the first mode whereby the control data for the controller 42 of the refrigerator/freezer showcase system 18 is computed, based on the status data of the air conditioner 24 and the status data of the refrigerator/freezer showcase unit 44 is determined to excel in energy-saving performance (YES in S24), the control variable computation unit 66 computes the control data for the controller 42 of the refrigerator/freezer showcase system 18, based on the status data of the air conditioner 24 and the status data of the refrigerator/freezer showcase unit 44 (S26) and transmits the computed data to the controller 42 of the refrigerator/freezer showcase system 18 (S28). The central coordinator 12 terminates the current process and proceeds to a subsequent process, whereupon the status of communication with the controller 42 is checked again.

The communication status determination unit 52 of the controller 42 of the refrigerator/freezer showcase system 18 initially checks the status of communication between the controller 42 and the central coordinator 12 (S40). When it is determined that proper communication status is not established between the controller 42 and the central coordinator 12 (NO in S40), the refrigerator/freezer showcase unit 44 in the refrigerator/freezer showcase system 18 is controlled in the local control mode. That is, the control variable computation unit 54 of the controller 42 computes the control data relative to the refrigerator/freezer showcase unit 44, based only on the status data of the refrigerator/freezer showcase unit 44. The equipment operation control unit 56 controls the refrigerator/freezer showcase unit 44 in accordance with the computed control data (S46).

When it is determined that proper communication status is established between the controller 42 and the central coordinator 12 (YES in S40), the controller receiver unit 50 of the controller 42 determines whether the request for transmission from the central coordinator 12 is received (S42). The information transmission unit 58 of the controller 42 transmits the status data of the refrigerator/freezer showcase unit 44 to the central coordinator 12 as required (S44). The communication status determination unit 52 of the controller 42 determines whether the control data (see S18 or S28) transmitted from the central coordinator 12 is received (S48). When it is determined that the control data is not received (NO in S48), the controller 42 controls the refrigerator/freezer showcase unit 44 in the local control mode (S46). When it is determined that the control data is received (YES in S48), the equipment operation control unit 56 of the controller 42 controls the refrigerator/freezer showcase unit 44, based on the control data transmitted from the central coordinator 12 (S50).

While the control of the refrigerator/freezer showcase unit 44 is explained above by way of example, the control of other equipment can be similarly performed.

A description will now be given, with reference to FIG. 8, of determination on energy saving performance made in the control variable computation unit 66. FIG. 8 is a flowchart for evaluation of power consumption over a predetermined interval. According to this flow, power consumption for a day is calculated as the sum of the hourly totals. That is, the sampling time is set to 1 hour. Initially, the total power consumption W is set to 0 (S110). A computation start time Ta is set. For example, the computation start time is set to 8:00 (S112). In this flow for evaluation, intra-day power consumption between 8:00 and 8:00 is calculated.

The preset temperature and humidity of the air conditioning equipment, the cooling air temperature of the refrigerator/freezer showcase and the like for 8:00 are set (S114) Subsequently, the infiltration heat load on the shop/facility, the infiltration heat load on the refrigerator/freezer showcase and the heat load handled by the air conditioning equipment for a period of one hour starting at 8:00 are determined by computation (S116). The one-hour power consumption $W_{cal}$ of the refrigeration facilities and air conditioning equipment is computed accordingly (S118). $W_{cal}$ is added to W (S120). A determination is made whether the time is 7:00 the next day (S122). When the time is not 7:00 the next day (NO in S122), the time T is incremented by $\Delta T$ (in this case, by one hour) (S124), whereupon steps S114 through S120 are repeated. When the time is 7:00 the next day (YES in S122), the simulation is terminated. At this point of time, W indicates a sum of power estimated to be consumed until 8:00 the next day.

The evaluation unit 106 is capable of determining preset values that minimize the power consumption W, by repeating the simulation illustrated in FIG. 8 in different conditions where the preset temperature and humidity of the air conditioning equipment, the cooling air temperature of the refrigerator/freezer showcase and the like are changed. The preset temperature and humidity of the air conditioning equipment may be a threshold value capable of retaining the comfort in the shop. The cooling air temperature of the refrigerator/freezer showcase may be a threshold value capable of maintaining the minimum cooling effect for cooling the refrigerator/freezer showcase. With this, it is possible to search for the most suitable presets values that minimize the power consumption W while maintaining the functions of the air conditioning equipment and the refrigerator/freezer showcase. This will obtain preset values that address requirements for comfort, while also achieving energy saving.

Using the simulation technology according to the described example enables whole-shop simulation of heat load and power consumption over a given period occurring in a space such as a food outlet, where air conditioning equipment and refrigerator/freezer showcases are collocated. This will allow determining how preset values of the equipment should be set for a given period of time for the purpose of energy saving. By computing heat load on a shop or equipment using estimated values of outdoor temperature and humidity that varies from season to season, simulation of power consumption of the shop equipment over a long period of time such as one year is enabled. The inventive simulation technology is equally applicable to shops other than food outlets and also to facilities other than retail outlets.

As described above, according to the cooperative control mode of the first embodiment, the control data relative to the controllers 22, 32 and 42 is computed, based on the status data of the corresponding equipment and the status data of at least another of equipment. With this, the controllers 22, 32 and 42 can be coordinated with each other in their control to achieve efficient control of the electric equipment and successful energy saving.

Figure 9:
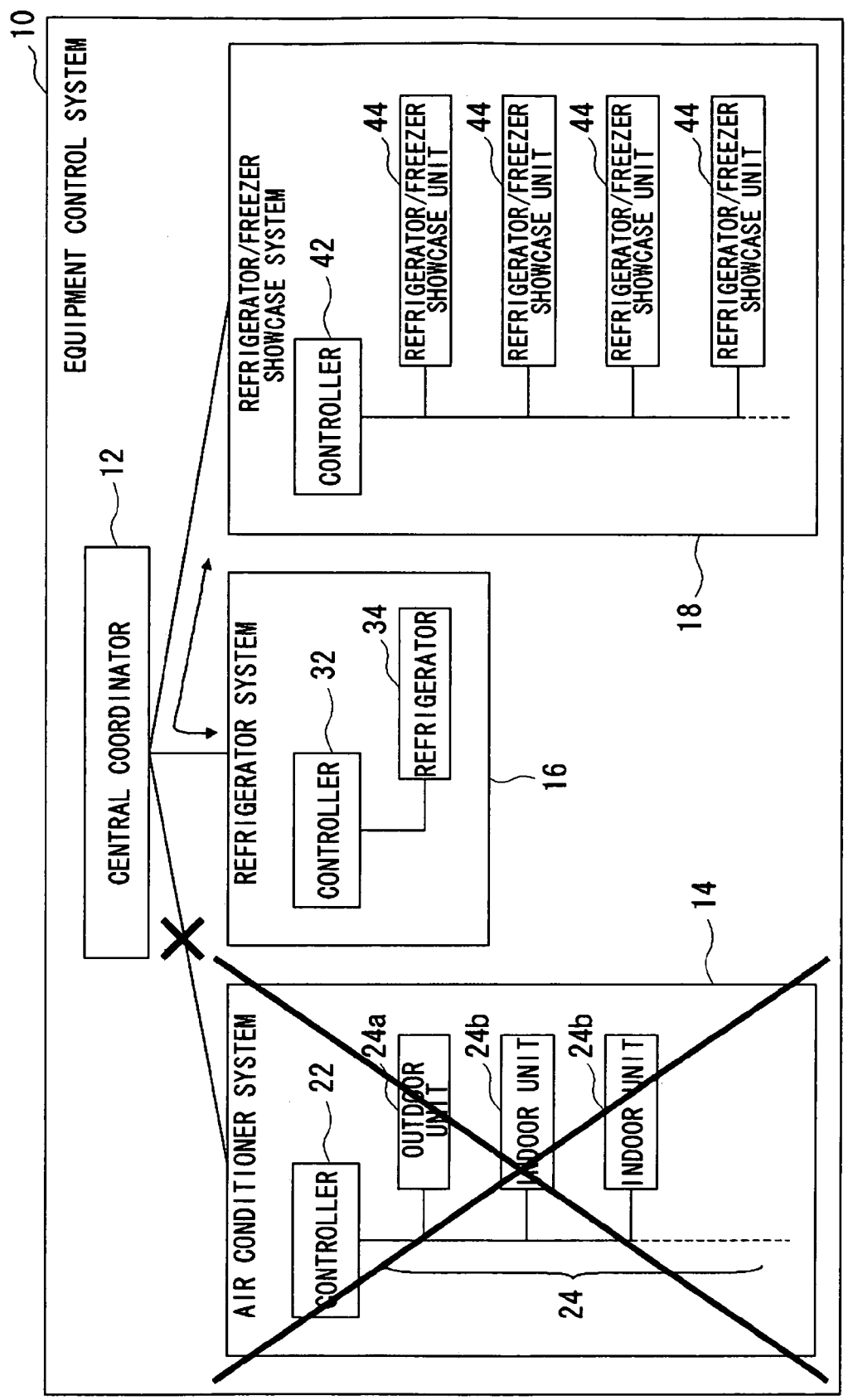
FIG. 9 illustrates a case in which the air conditioner system is down.

For example, even when one of the systems coordinated by the central coordinator 12 is down due to a failure or the like and when the status data of the electric equipment in the failed system is not sent to the central coordinator 12, the other systems continue to be properly controlled by the central coordinator 12. FIG. 9 illustrates a case in which the air conditioner system 14 is down and the status data related to the air conditioner 24 fails to be sent from the air conditioner system 14 to the central coordinator 12. Even in the case illustrated in FIG. 9, the refrigerator 34 and the refrigerator/freezer showcase unit 44 of the refrigerator system 16 and the refrigerator/freezer showcase system 18, respectively, are properly operated, by mutual cooperation or system-to-system independent operation. That is, the central coordinator 12 computes the control data using the status data of the electric equipment transmitted from the refrigerator system 16 and the refrigerator/freezer showcase system 18. The refrigerator system 16 and the refrigerator/freezer showcase system 18 are operated properly in the local control mode or the cooperative control mode.

By controlling the electric equipment by using a plurality of control modes including the local control mode and the cooperative control mode, control of the electrical equipment flexibly adapted to the environment is achieved. Since the control data for the controllers 22, 32 and 42 computed by the central coordinator 12 is computed by referring to the status of communication with the controllers 22, 32 and 42 and the energy efficiency, efficient control of the electric equipment adapted to actual situations is achieved. When the local control mode excels in energy saving performance than the cooperative control mode, the local control mode is selected even if the cooperative control mode is possible. In this way, energy saving is effectively achieved.

Figure 10:
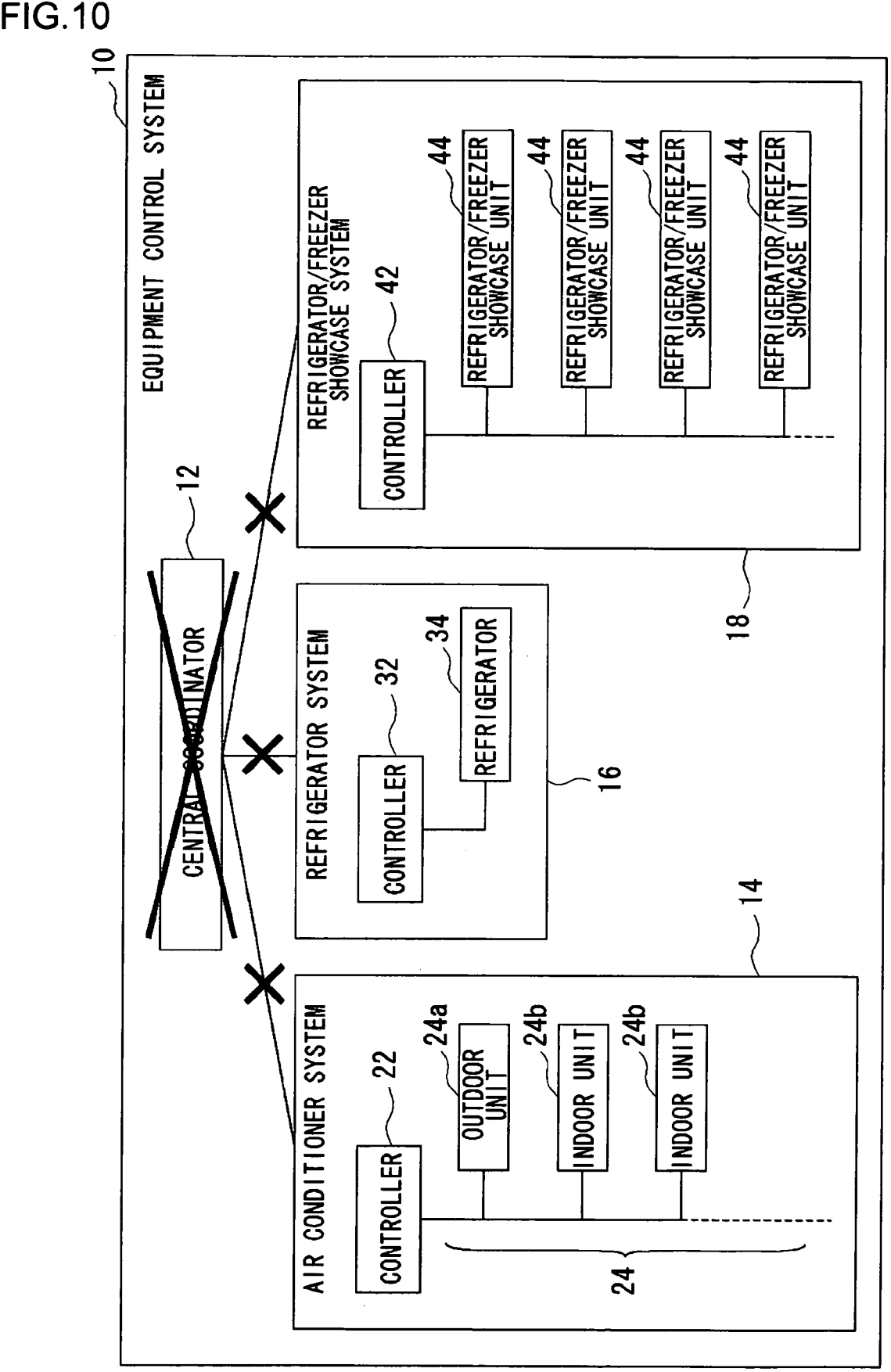
FIG. 10 illustrates a case in which the central coordinator is down.

Further, each of the controllers 22, 32 and 42 is capable of controlling the corresponding electric equipment, based only on the status data of the electric equipment subject to the controller's control without depending on the central coordinator 12. Accordingly, even when the central coordinator 12 is down as illustrated in FIG. 10 due to a failure or the like, each of the controllers 22, 32 and 42 of the respective systems is capable of properly controlling the corresponding electrical equipment in the local control mode. Even when any of the systems coordinated by the central coordinator 12 is replaced, the other systems continue to be properly controlled by the central coordinator 12.

Second Embodiment

Components in the second embodiment corresponding to those of the first embodiment are represented by like reference numerals and the detailed description thereof is omitted.

The central coordinator 12 according to the second embodiment functions as a relay unit for linking the controllers 22, 32 and 42 instead of functioning as a supervising unit. That is, the central coordinator 12 illustrated in FIG. 1 transmits the status data of the electric equipment transmitted from each of the controllers 22, 32 and 42 to the other controllers. More specifically, the central coordinator 12 according to the second embodiment is provided with the functions illustrated in FIG. 11.

Figure 11:
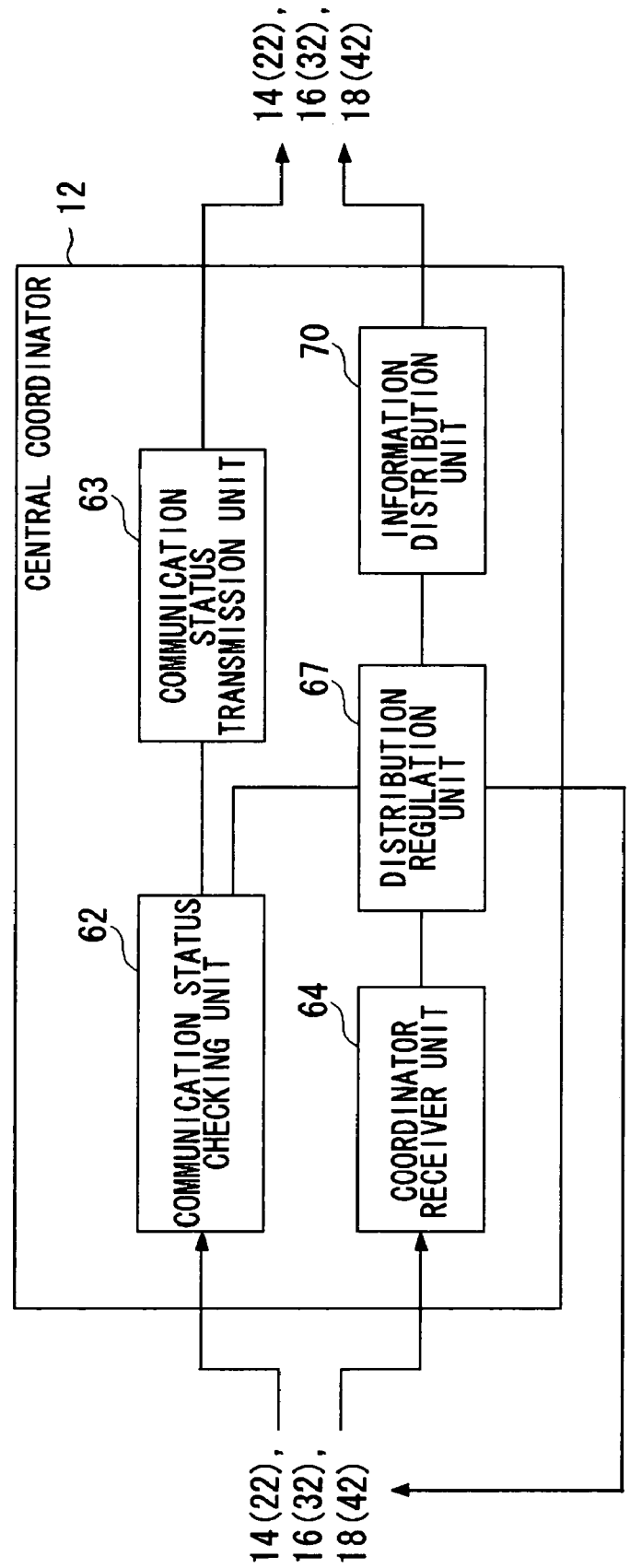
FIG. 11 is a block diagram illustrating the functions primarily related to the control of electric equipment, which are among the functions provided in the central coordinator according to a second embodiment of the present invention.

FIG. 11 is a block diagram illustrating the functions primarily related to the control of electric equipment, which are among the functions provided in the central coordinator 12 according to the second embodiment. The central coordinator 12 comprises a communication status checking unit 62, a communication status transmission unit 63, a coordinator receiver unit 64, a distribution regulation unit 67 and an information distribution unit 70.

The communication status transmission unit 63 transmits the communication status checked by the communication status checking unit 62 to the controller 22 of the air conditioner system 14, the controller 32 of the refrigerator system 16 and the controller 42 of the refrigerator/freezer showcase system 18. With this, each of the controllers 22, 32 and 42 is informed of the communication status occurring between the communication status checking unit 62 and the other controllers.

The distribution regulation unit 67 determines the destination system for transmission of the status data of the electric equipment transmitted from the coordinator receiver unit 64 to the controller. For example, when the refrigerator system 16 needs the status data related to the refrigerator/freezer showcase unit 44 but does not need the status data related to the air conditioner 24, the distribution regulation unit 67 determines that only the status data transmitted from the controller 42 of the refrigerator/freezer showcase system 18 should be sent to the refrigerator system 16 and prevents the status data transmitted from the controller 22 of the air conditioner system 14 from being sent to the refrigerator system 16. When the refrigerator system 16 needs the status data related to the air conditioner 24 as well, the distribution regulation unit 67 may determine that the status data transmitted from the controller 22 of the air conditioner system 14 is also sent to the refrigerator system 16. The distribution regulation unit 67 may modify the data format of the status data as required, so as to ensure that the status data is properly used in the controllers 22, 32 and 42.

The information distribution unit 70 distributes the information transmitted from the controllers 22, 32 and 42 to the controllers 22, 32 and 42, in accordance with the determination of the distribution regulation unit 67. With this, each of the controllers 22, 32 and 42 is capable of acquiring the status data related to the electric equipment of the other systems.

Each of the controllers 22, 32 and 42 according to the second embodiment has the function of controlling the corresponding electric equipment, based on the status data of the electric equipment subject to the controller's control for operation and the status data of other electric equipment transmitted from the central coordinator 12, and the function of controlling the corresponding electric equipment, based only on the status data of the electric equipment subject to the controller's control for operation. Each of the controllers 22, 32 and 42 computes the control data of the corresponding electric equipment and, more specifically, is provided with the functions illustrated in FIG. 12. The description with reference to FIG. 12 concerns the controller 22 of the air conditioner system 14 by way of example.

Figure 12:
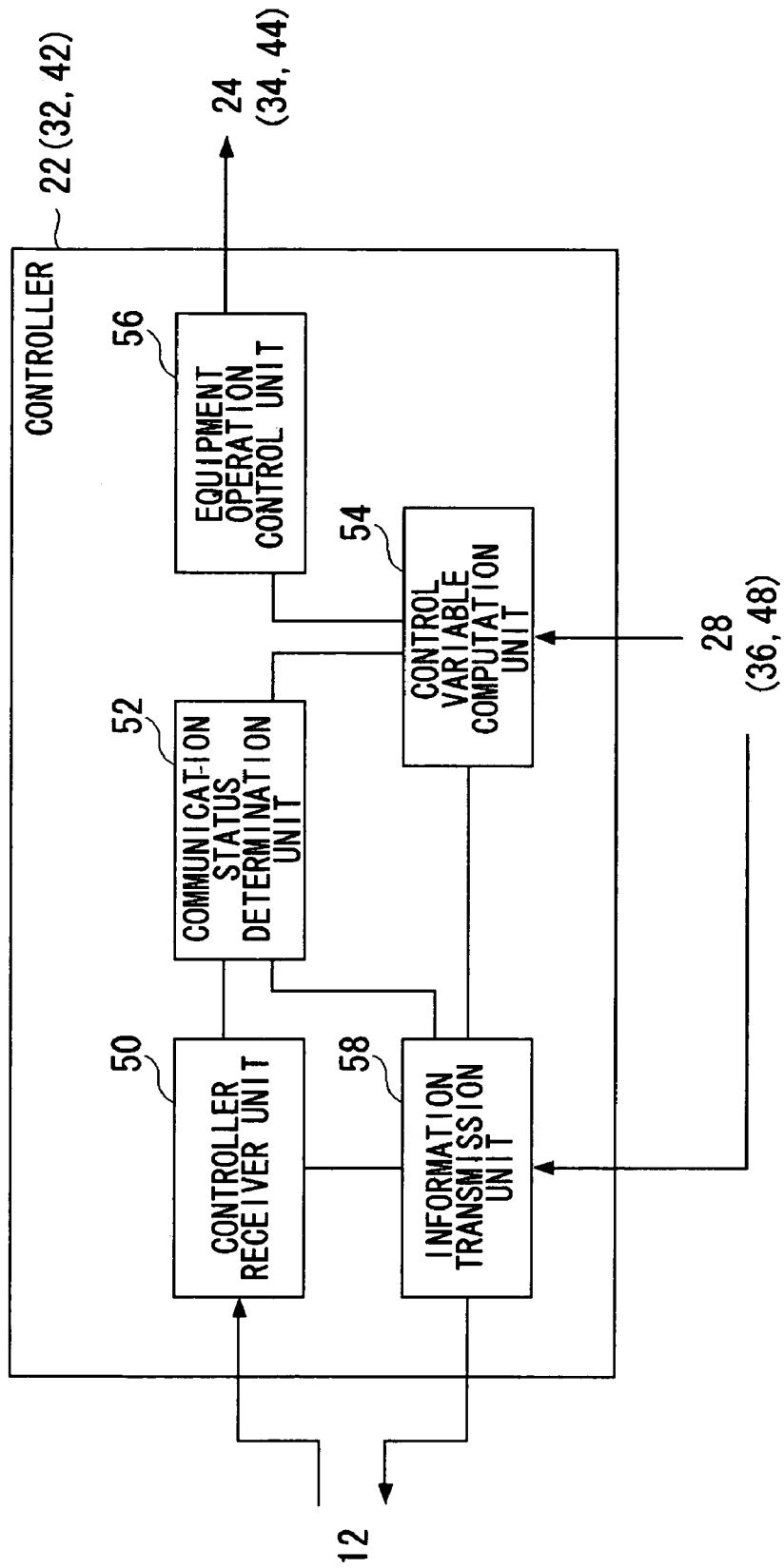
FIG. 12 is a block diagram illustrating the functions primarily related to the control of an air conditioner, which are among the functions provided in a controller of an air conditioner system according to the second embodiment.

FIG. 12 is a block diagram illustrating the functions primarily related to the control of the air conditioner 24, which are among the functions provided in the controller 22 of the air conditioner system 14 according to the second embodiment. The controller 22 of the air conditioner system 14 according to the second embodiment comprises a controller receiver unit 50, a communication status determination unit 52, a control variable computation unit 54, an equipment operation control unit 56 and an information transmission unit 58.

The control variable computation unit 54 determines whether to control the air conditioner 24, based on the status data of the air conditioner 24 and the status data of other electric equipment, or to control the air conditioner 24, based only on the status data of the air conditioner 24. The control variable computation unit 54 determines the method of controlling the air conditioner 24, based on the result of detecting the status of communication between the central coordinator 12 and the controllers 32 and 42 as transmitted from the central coordinator 12, the result of detecting the status of communication between the central coordinator 12 and the controller 22 by the communication status determination unit 52, or the result of simulation-based computation described above for determining the energy efficiency.

The controller 32 of the refrigerator system 16 and the controller 42 of the refrigerator/freezer showcase system 18 also have a similar structure as the controller 22 of the air conditioner system 14 illustrated in FIG. 12. Similarly to the controller 22 of the air conditioner system 14, the controller 32 of the refrigerator system 16 and the controller 42 of the refrigerator/freezer showcase system 18 also control the operation of the corresponding electrical equipment and transmit the status data of the corresponding electric equipment to the central coordinator 12.

Each of the controllers 22, 32 and 42 is provided with the functional blocks illustrated in FIG. 6 including the caloric computation unit 102, the power consumption computation unit 104, the evaluation unit 106, the shop/facility caloric computation unit 108, the refrigeration facilities caloric computation unit 110 and the air conditioning equipment caloric computation unit 112. The controllers 22, 32 and 42 assess the energy saving performance according to the flowchart of FIG. 8.

The other aspects of structure are the same as the corresponding aspects of the first embodiment.

Figure 13:
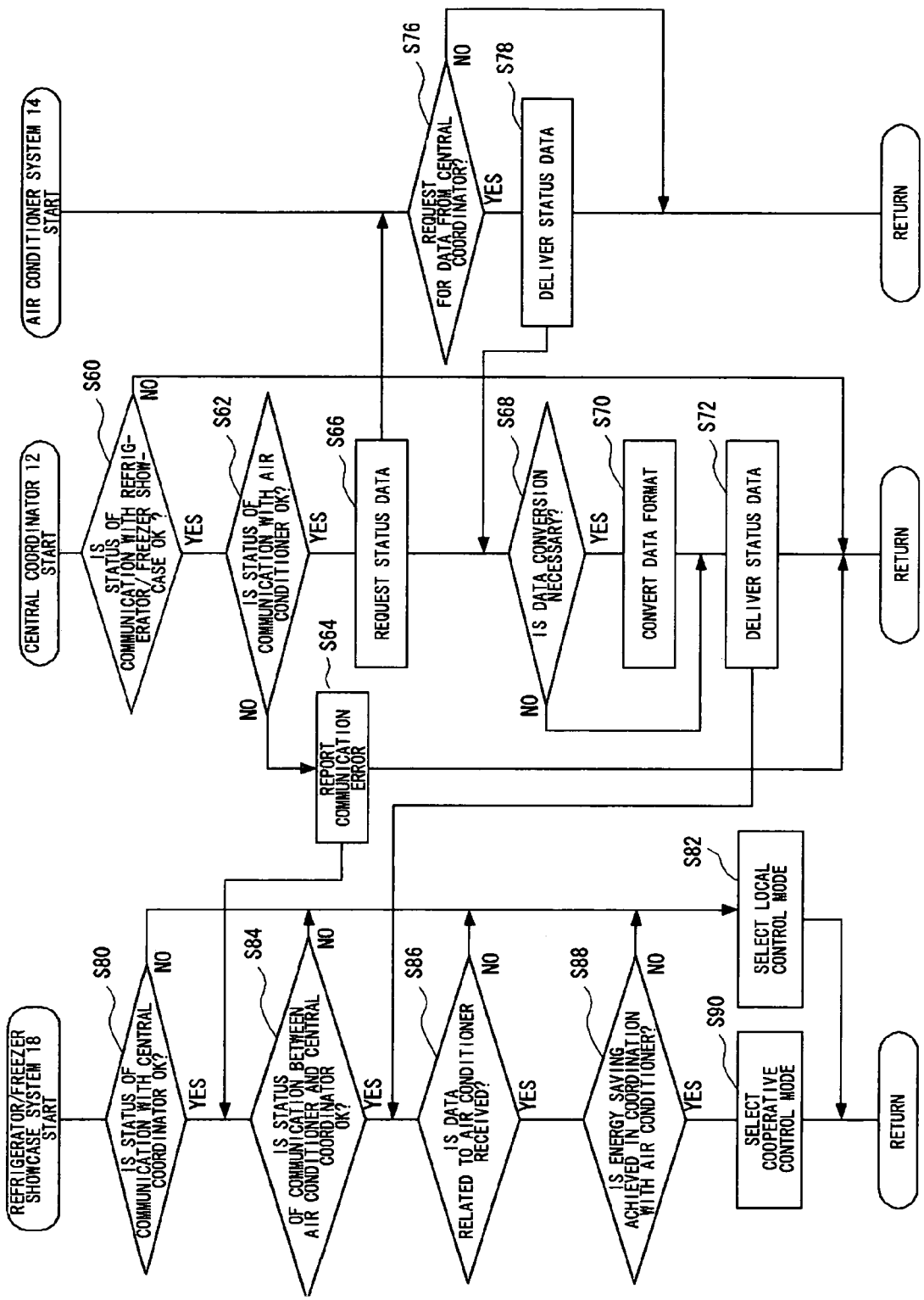
FIG. 13 is a flowchart illustrating the overall flow of control of a refrigerator/freezer showcase unit according to the second embodiment.

A description will now be given, with reference to FIG. 13, of the operation of the equipment as a whole constituting the equipment control system 10 according to the second embodiment. FIG. 13 is a flowchart illustrating the overall flow of control of the refrigerator/freezer showcase unit according to the second embodiment. FIG. 13 illustrates a case where the refrigerator/freezer showcase system 18 is controlled, based on the status data of the air conditioner 24 of the air conditioner system 14.

Initially, the communication status checking unit 62 of the central coordinator 12 checks the status of communication between the controller 42 of the refrigerator/freezer showcase system 18 and the central coordinator 12. (S60 of FIG. 13). When it is determined that proper communication status is not established between the controller 42 and the central coordinator 12 (NO in S60), the central coordinator 12 terminates the current process, whereupon the status of communication with the controller 42 is checked again. When it is determined that proper communication status is established between the controller 42 and the central coordinator 12 (YES in S60), the communication status checking unit 62 of the central coordinator 12 checks the status of communication between the controller 22 of the air conditioner system 14 and the central coordinator 12 (S62).

When it is determined that proper communication status is not established between the controller 22 and the central coordinator 12 (NO in S62), the communication status transmission unit 63 of the central coordinator 12 notifies the controller 42 of the refrigerator/freezer showcase system 18 that a communication error occurs between the controller 22 and the central coordinator. 12 (S64). The central coordinator 12 terminates the current process and proceeds to a subsequent process, whereupon the status of communication with the controller 42 is checked again.

In contrast, when it is determined that proper communication status is established between the controller 22 and the central coordinator 12 (YES in S62), the distribution regulation unit 67 of the central coordinator 12 requests the controller 22 of the air conditioner system 14 to transmit the status data of the air conditioner 24 to the central coordinator 12 (S66). The controller receiver unit 50 of the controller 22 determines whether the request for transmission of the status data of the air conditioner 24 is received (S76). When the controller receiver unit 50 of the controller 22 receives the request for transmission (YES in S76), the information transmission unit 58 of the controller 22 transmits the status data of the air conditioner 24 to the central coordinator 12 (S78). The controller 22 terminates the current process and proceeds to a subsequent process, whereupon a determination is made again as to whether the request for transmission of the status data of the air conditioner 24 is received. In contrast, when the controller receiver 50 of the controller 22 does not receive the request for transmission (NO in S76), a determination is made by the controller 22 again as to whether the request for transmission of the status data of the air conditioner 24 is received.

When the coordinator receiver unit 64 of the central coordinator 12 receives the status data of the air conditioner 24 transmitted from the controller 22 of the air conditioner system 14 in accordance with the request for transmission (S66), the distribution regulation unit 67 of the central coordinator 12 determines whether data conversion is necessary in order for the controller 42 of the refrigerator/freezer showcase system 18 to use the status data of the air conditioner 24 received (S68). When it is determined that data conversion is necessary (YES in S68), the distribution regulation unit 67 performs necessary data conversion so as to modify the status data of the air conditioner 24 into an appropriate format. When it is determined that data conversion is not necessary (NO in S68), data conversion is not performed and control is turned to the next process. The status data of the air conditioner 24 is transmitted by the information distribution unit 70 of the central coordinator 12 to the controller 42 of the refrigerator/freezer showcase system 18 (S72). The central coordinator 12 terminates the current process and proceeds to a subsequent process, whereupon the status of communication with the controller 42 is checked again.

The status of communication between the controller 42 and the central coordinator 12 is determined by the communication status determination unit 52 of the controller 42 of the refrigerator/freezer showcase system 18 (S80). When it is determined that proper communication status is not established between the controller 42 and the central coordinator 12 (NO in S80), the control variable computation unit 54 computes the control data related to the refrigerator/freezer showcase unit 44, based only on the status data of the refrigerator/freezer showcase unit 44. The equipment operation control unit 56 controls the refrigerator/freezer showcase unit 44, based on the control data thus computed (S82).

When it is determined that proper communication status is established between the controller 42 and the central coordinator 12 (YES in S80), the control variable computation unit 54 of the controller 42 determines whether proper communication is enabled between the central coordinator 12 and the controller 22, based on "the status of communication between the central coordinator 12 and the controller 22 of the air conditioner system 14" (see S64) transmitted from the central coordinator 12 (S84). When it is determined that proper communication between the central coordinator 12 and the controller 22 is difficult (NO in S84), the controller 42 controls the refrigerator/freezer showcase unit 44 in the local control mode (S82).

When it is determined that proper communication is enabled between the central coordinator 12 and the controller 22 (YES in S84), the control variable computation unit 54 determines whether the status data related to the air conditioner 24 is received from the central coordinator 12 (S86). When it is determined that the status data related to the air conditioner 24 is not received (NO in S86), the controller 42 controls the refrigerator/freezer showcase unit 44 in the local control mode (S82). In contrast, when it is determined that the status data related to the air conditioner 24 is received (YES in S86), the control variable computation unit 54 of the controller 42 determines which of a first and second modes of computation better serves the energy saving purpose, i.e., the first mode whereby the control data for the controller 42 of the refrigerator/freezer showcase system 18 is computed, based on the status data of the air conditioner 24 and the status data of the refrigerator/freezer showcase unit 44, and the second mode whereby the control data for the controller 42 of the refrigerator/freezer showcase system 18 is computed, based only on the status data of the refrigerator/freezer showcase unit 44 (S88). When the second mode is better in energy saving performance (NO in S88), the controller 42 controls the refrigerator/freezer showcase unit 44 in the local control mode (S82). In contrast, when the first mode excels in energy saving performance (YES in S88), the refrigerator/freezer showcase unit 44 of the refrigerator/freezer showcase system 18 is controlled in the cooperative control mode. That is, the control variable computation unit 54 of the controller 42 computes the control data for the controller 42 of the refrigerator/freezer showcase system 18, based on the status data of the air conditioner 24 and the status data of the refrigerator/freezer showcase unit 44, so as to control the refrigerator/freezer showcase unit 44 accordingly (S90).

As described above, according to the cooperative control mode of the second embodiment, the control data relative to the controllers 22, 32 and 42 is computed, based on the status data of the corresponding equipment and the status data of at least another equipment group. Accordingly, energy saving is achieved by efficiently controlling the electric equipment.

Since the controllers 22, 32 and 42 are capable of computing the control data on their own, a situation can be avoided in which the corresponding electric equipment cannot be controlled due to the influence from the central coordinator 12 or other equipment. For example, even when any of the systems coordinated by the central coordinator 12 is down or the central coordinator 12 itself is down, as illustrated in FIGS. 9 and 10, the electric equipment in a system in a normal condition continues to be operated properly. The computation of control data is done in the controllers 22, 32 and 42 and so, when a need arises to replace equipment in any of the systems, only the equipment that needs replacement may be replaced without requiring modification in the central coordinator 12 or in the equipment of the other systems. When the controllers 22, 32 and 42 are operated based on software and a need arises to replace software of one of the controllers, software may be replaced in each equipment unit without requiring software replacement in the whole equipment.

According to the present invention, the control data for the equipment controllers is computed, based on the status data of the corresponding equipment and the status data of at least another equipment group. With this, the equipment controllers can be coordinated with each other with respect to their status of control for efficient control of the electric equipment and successful energy saving.

It is to be understood that the invention is not limited to the embodiments as set forth. The elements of the embodiments and their variations are appropriately combined as alternative modes of practicing the invention. Various modifications and alternatives to the embodiments and variations, including design change, will be apparent to those skilled in the art, all of which fall within the spirit and scope of the present invention.

For example, the central coordinator 12 may be connected to an external center or the like via a network. With this, remote monitoring and remote control by the external center or the like is possible. The network may be a LAN or a WAN. Whichever of the types of network, a wireless network and a wired network, serves the purpose. The central coordinator 12 and the external center or the like may be directly connected to each other by a cable and so on without using a network. Alternatively, the central coordinator 12 and the external center or the like may be integrally formed, i.e., formed as a single server.

Exchange of various data between the central coordinator 12 and the controllers 22, 32 and 42 according to the embodiments may be performed according to an arbitrary method as long as it enables appropriate transmission and reception of data. For example, for the central coordinator 12 to acquire various data from the controllers 22, 32 and 42, the controllers 22, 32 and 42 may transmit the various data periodically on their own initiative, instead of the central coordinator 12 requesting the transmission of the various data from the controllers 22, 32 and 42. Further, for the controllers 22, 32 and 42 to acquire various data from the central coordinator 12, the controllers 22, 32 and 42 may request the transmission of necessary data from the central coordinator 12 on their own so that the central coordinator 12 may transmit the necessary data to the controllers 22, 32 and 42 in response to the request, instead of the central coordinator 12 transmitting the various data to the controllers 22, 32 and 42 on its own. These modes as well as the modes of transmission and reception described in the embodiments may be used in combination with each other as required, so as to enable the use of a scheme adapted to a situation selected from a mixture of various data transmission and reception schemes. When data conversion is required in exchanging the various data, the central coordinator 12 and the controllers 22, 32 and 42 convert the various data into an appropriate format. For example, when data subjected to data conversion needs to be delivered to the controllers 22, 32 and 42 in a process wherein the controllers 22, 32 and 42 request the central coordinator 12 to transmit data for the central coordinator 12 to transmit the various data to the controllers 22, 32 and 42, the central coordinator 12 transmits properly converted data in response to the request for transmission of data from the controllers 22, 32 and 42.

In assessing the energy saving performance of the equipment control system 10, not only the predetermined computational expressions described above but also other relational expressions for assessing the level of energy saving may be used. The energy saving performance can be assessed not only by taking into account the computed values of heat load on the system as a whole and the result of simulation-based computation of data related to the equipment operated in coordination, but also by taking into account other factors.

For example, the central coordinator 12 of the first embodiment may refer to the result of computation using a relational expression capable of assessing the level of energy saving and different from the computational expression described above, so as to determine whether to compute the control data for the controllers 22, 32 and 42, based on the status data of the corresponding equipment and the status data of at least another equipment group, or to compute the control data, based only on the status data of the corresponding equipment. The controllers 22, 32 and 42 of the second embodiment may refer to a relational expression capable of assessing the level of energy saving and different from the computational expression described above, so as to determine whether to control the corresponding equipment group, based on the status data of the equipment group subject to the controller's control for operation and the status data of another equipment group, or to control the corresponding equipment, based only on the status data of the equipment subject to the controller's control for operation. By using a relational expression with a simpler form than the predetermined computational expression described above and capable of assessing the energy saving performance unequivocally, assessment of energy saving performance can be made in a simplified manner and the hardware structure and software structure to implement the assessment is built in a more simplified fashion. According to one such example of assessment, the preset refrigerant evaporation temperature of the refrigerator 34 at the lower pressure side may be increased by a predetermined amount, when the difference temperature of the refrigerator/freezer showcase as detected is smaller than a predetermined value. In this case, energy saving is achieved by using a relatively simple relational expression "difference temperature of refrigerator/freezer showcase<predetermined value" whereby a determination is made as to whether the difference temperature of the refrigerator/freezer showcase is smaller than the predetermined value or not. This will prevent an increase in the complexity of hardware and software implementing the central coordinator 12 and the controllers 22, 32 and 42 making a determination. Therefore, the cost of fabricating and developing the central coordinator 12 and the controllers 22, 32 and 42 is reduced.

What is claimed is:

1. An equipment control system comprising:
    a plurality of equipment groups;
    an equipment controller which is provided in each equipment group and which controls the operation of the corresponding equipment group; and
    a supervising unit which supervises the equipment controllers, receives status data of the equipment groups transmitted from the equipment controllers, and computes control data for each of the equipment controllers, based on the status data of the corresponding equipment group and the status data of at least another equipment group constituting a system different from the corresponding equipment group, wherein
    each of the equipment controllers controls the corresponding equipment group, based on the control data computed by the supervising unit.

2. The equipment control system according to claim 1, wherein the supervising unit is provided not only with the function of computing the control data for each of the controllers, based on the status data of the corresponding equipment group and the status data of at least another equipment group, but also with the function of computing the control data for each of the controllers, based only on the status data of the corresponding equipment group.

3. The equipment control system according to claim 2, wherein the supervising unit detects the status of communication with the equipment controllers, and determines, based on the result of detection of the status of communication with the equipment controllers, whether to compute the control data for each of the equipment controllers, based on the status data of the corresponding equipment group and the status data of at least another equipment group, or to compute the control data for each of the equipment controllers, based only on the status data of the corresponding equipment group.

4. The equipment control system according to claim 2, wherein the supervising unit determines, based on the result of simulation-based computation for determining energy efficiency, whether to compute the control data for each of the equipment controllers, based on the status data of the corresponding equipment group and the status data of at least another equipment group, or to compute the control data for each of the equipment controllers, based only on the status data of the corresponding equipment group.

5. The equipment control system according to claim 3, wherein the supervising unit determines, based on the result of simulation-based computation for determining energy efficiency, whether to compute the control data for each of the equipment controllers, based on the status data of the corresponding equipment group and the status data of at least another equipment group, or to compute the control data for each of the equipment controllers, based only on the status data of the corresponding equipment group.

6. The equipment control system according to claim 2, wherein the supervising unit determines, based on the result of computation using a predetermined relational expression for evaluating energy saving performance, whether to compute the control data for each of the equipment controllers, based on the status data of the corresponding equipment group and the status data of at least another equipment group, or to compute the control data for each of the equipment controllers, based only on the status data of the corresponding equipment group.

7. The equipment control system according to claim 3, wherein the supervising unit determines, based on the result of computation using a predetermined relational expression for evaluating energy saving performance, whether to compute the control data for each of the equipment controllers, based on the status data of the corresponding equipment group and the status data of at least another equipment group, or to compute the control data for each of the equipment controllers, based only on the status data of the corresponding equipment group.

8. The equipment control system according to claim 1, wherein each of the equipment controllers is provided not only with the function of controlling the corresponding equipment group, based on the control data computed by the supervising unit but also with the function of controlling the corresponding equipment group, based only on the status data of the corresponding equipment group without depending on the control data transmitted from the supervising unit.

9. The equipment control system according to claim 2, wherein each of the equipment controllers is provided not only with the function of controlling the corresponding equipment group, based on the control data computed by the supervising unit but also with the function of controlling the corresponding equipment group, based only on the status data of the corresponding equipment group without depending on the control data transmitted from the supervising unit.

10. The equipment control system according to claim 8, wherein each of the equipment controllers detects the status of communication with the supervising unit and determines, based on the result of detection of the status of communication with the supervising unit, whether to control the corresponding equipment group, based on the control data transmitted from the supervising unit, or to control the corresponding equipment group, based only on the status data of the corresponding equipment group without depending on the control data transmitted from the supervising unit.

11. The equipment control system according to claim 9, wherein each of the equipment controllers detects the status of communication with the supervising unit and determines, based on the result of detection of the status of communication with the supervising unit, whether to control the corresponding equipment group, based on the control data transmitted from the supervising unit, or to control the corresponding equipment group, based only on the status data of the corresponding equipment group without depending on the control data transmitted from the supervising unit.

12. The equipment control system according to claim 1, wherein the equipment groups include equipment that affects room temperature depending on its operating conditions.

13. An equipment control system comprising:
    a plurality of equipment groups;

an equipment controller which is provided in each equipment group and which controls the operation of the corresponding equipment group; and a relay unit which transmits status data of the equipment group transmitted from each of the equipment controllers to an equipment controller of another system, wherein each of the equipment controllers controls the corresponding equipment group, based on the status data of the equipment group subject to the controller's control for operation and the status data of at least another equipment group constituting a system different from the corresponding equipment group transmitted from the relay unit.

14. The equipment control system according to claim 13, wherein each of the equipment controllers is provided not only with the function of controlling the corresponding equipment group, based on the status data of the equipment group subject to the controller's control for operation and the status data of at least another equipment group transmitted from the relay unit but also with the function of controlling the corresponding equipment group, based only on the status data of the equipment group subject to the controller's control for operation.

15. The equipment control system according to claim 14, wherein the relay unit detects the status of communication with the equipment controllers, and each of the equipment controllers determines, based on the status of communication between the relay unit and the other equipment controllers as detected by the relay unit, whether to control the corresponding equipment group, based on the status data of the equipment group subject to the controller's control for operation and the status data of another equipment group, or to control the corresponding equipment group, based only on the status data of the equipment group subject to the controller's control for operation.

16. The equipment control system according to claim 14, wherein each of the equipment controllers detects the status of communication with the relay unit, and determines, based on the result of detection of the status of communication with the relay unit, whether to control the corresponding equipment group, based on the status data of the equipment group subject to the controller's control for operation and the status data of another equipment group, or to control the corresponding equipment group, based only on the status data of the equipment group subject to the controller's control for operation.

17. The equipment control system according to claim 14, wherein each of the equipment controllers determines, based on the result of simulation-based computation for determining energy efficiency, whether to control the corresponding equipment group, based on the status data of the equipment group subject to the controller's control for operation and the status data of another equipment group, or to control the corresponding equipment group, based only on the status data of the equipment group subject to the controller's control for operation.

18. The equipment control system according to claim 14, wherein each of the equipment controllers determines, based on the result of computation using a predetermined relational expression for evaluating energy saving performance, whether to control the corresponding equipment group, based on the status data of the equipment group subject to the controller's control for operation and the status data of another equipment group, or to control the corresponding equipment group, based only on the status data of the equipment group subject to the controller's control for operation.

19. The equipment control system according to claim 13, wherein the equipment groups include equipment that affects room temperature depending on its operating conditions.

* * * * *